United States Patent
Eikermann

(10) Patent No.: US 12,233,670 B2
(45) Date of Patent: Feb. 25, 2025

(54) PNEUMATIC VEHICLE TYRE WITH CIRCUMFERENTIAL GROOVE

(71) Applicant: Continental Reifen Deutschland GmbH, Hannover (DE)

(72) Inventor: Wilke Eikermann, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/252,727

(22) PCT Filed: Nov. 9, 2021

(86) PCT No.: PCT/DE2021/200185
§ 371 (c)(1),
(2) Date: May 12, 2023

(87) PCT Pub. No.: WO2022/100800
PCT Pub. Date: May 19, 2022

(65) Prior Publication Data
US 2024/0025213 A1    Jan. 25, 2024

(30) Foreign Application Priority Data
Nov. 13, 2020   (DE) .................... 10 2020 214 281.5

(51) Int. Cl.
*B60C 11/13*     (2006.01)
*B60C 11/04*     (2006.01)
*B60C 11/03*     (2006.01)

(52) U.S. Cl.
CPC ....... *B60C 11/13* (2013.01); *B60C 2011/0353* (2013.01); *B60C 2011/0355* (2013.01)

(58) Field of Classification Search
CPC ....... B60C 11/13; B60C 11/042; B60C 11/04; B60C 11/0323; B60C 11/125;
(Continued)

(56) References Cited

U.S. PATENT DOCUMENTS

| 2,322,505 A | * | 6/1943 | Bull ................. B60C 11/04 |
| | | | 152/DIG. 1 |
| 5,503,207 A | * | 4/1996 | Ochiai ............ B60C 11/1369 |
| | | | 152/209.21 |

(Continued)

FOREIGN PATENT DOCUMENTS

| DE | 102015215455 A1 | 2/2017 |
| FR | 2971732 A1 | 8/2012 |

(Continued)

OTHER PUBLICATIONS

International Search Report dated Feb. 22, 2022 of International Application PCT/DE2021/200185 on which this application is based.

(Continued)

*Primary Examiner* — Cedrick S Williams
(74) *Attorney, Agent, or Firm* — Richard A. Wolf; Gregory Adams

(57) ABSTRACT

A pneumatic vehicle tire having a tread (2) which has a profiling and which has at least one circumferential groove (1) which runs in encircling fashion in the circumferential direction of the pneumatic vehicle tire and is formed to a profile depth PT and which has, in alternating fashion over the entire tire circumference over partial sections (21, 24) of the circumference of the pneumatic vehicle tire, a first cross section perpendicular to the circumferential direction and a second cross section perpendicular to the circumferential direction. The first cross section is made up of at least two groove portions adjoining one another in a first radial direction $R_1$ of the pneumatic vehicle tire, a first groove portion (3) which is symmetrical to the first radial direction $R_1$ and the width $B_{V,1}$ of which in the axial direction A of the pneumatic vehicle tire is less than 3 mm and varies by no more than 10%, and a radially inner second groove portion (Continued)

(4) which extends in the axial direction A in relation to the first groove portion (3) and has the largest cross-sectional area of all of the groove portions. The second cross section is made up of at least two groove portions which adjoin one another in a second radial direction $R_2$ of the pneumatic vehicle tire and are symmetrical to the radial direction $R_2$, a first groove portion (33) which widens outward, and an inner second groove portion (34) which is narrowed in relation to the first groove portion and the width $B_{Y,2}$ of which varies in the axial direction A of the pneumatic vehicle tire by no more than 10% and is less than 40% of the width $B_{Y,O}$ in the axial direction A of the second cross section on the surface of the tread when the pneumatic vehicle tire is new. The second groove portion (34) of the second cross section extends here in the radial direction $R_2$ over at least 50% of the height $H2_Y$ of the second groove portion (4) of the first cross section in the radial direction $R_1$, and over at least 50% of its height $H2_Y$ in the radial direction $R_2$ is at a distance from the surface of the tread (2), at which the second groove portion (4) is located in the first cross section.

10 Claims, 11 Drawing Sheets

(58) Field of Classification Search
CPC ..... B60C 2011/0339; B60C 2011/0341; B60C 2011/0386
See application file for complete search history.

(56) References Cited

U.S. PATENT DOCUMENTS

| | | |
|---|---|---|
| 11,034,191 B2 | 6/2021 | Keefe et al. |
| 2014/0090761 A1 | 4/2014 | Foucher et al. |
| 2014/0352863 A1 | 12/2014 | Marlier et al. |
| 2016/0297252 A1 | 10/2016 | Cambon et al. |
| 2018/0170116 A1 | 6/2018 | Daries |
| 2020/0029865 A1 | 1/2020 | Koike et al. |
| 2020/0164694 A1 | 5/2020 | Keefe et al. |
| 2023/0219374 A1* | 7/2023 | Neau .................. B60C 11/125 152/209.18 |

FOREIGN PATENT DOCUMENTS

| | | |
|---|---|---|
| KR | 20090053384 A * | 5/2009 |
| WO | 2013083610 A1 | 6/2013 |
| WO | 2015082310 A1 | 6/2015 |
| WO | 2017174925 A1 | 10/2017 |
| WO | 2017176280 A1 | 10/2017 |

OTHER PUBLICATIONS

EP Examination report dated Jan. 13, 2025 for counterpart EP Application No. 21823177.7.

* cited by examiner

PNEUMATIC VEHICLE TYRE WITH CIRCUMFERENTIAL GROOVE

The invention relates to a pneumatic vehicle tire having a tread which has a profiling and which has at least one circumferential groove which runs in encircling fashion in the circumferential direction of the pneumatic vehicle tire and is formed to a profile depth PT and which has, in alternating fashion over the entire tire circumference over partial sections of the circumference of the pneumatic vehicle tire, a first cross section and a second cross section perpendicular to the circumferential direction.

PRIOR ART

It is known and customary to provide the tread of pneumatic utility vehicle tires with circumferential grooves running in encircling fashion in the circumferential direction. Such circumferential grooves mutually separate circumferential ribs which can be provided with further grooves, for example transverse grooves, which impart to the circumferential ribs a block-type structure.

The structure of a circumferential groove is defined by its cross section perpendicular to the circumferential direction. This may be the same over the entire circumference of a pneumatic vehicle tire or it may be different in different partial sections of the circumference.

Circumferential grooves with a cross section perpendicular to the circumferential direction of the pneumatic vehicle tire, which has only one groove portion, are widespread in treads of pneumatic vehicle tires. However, a cross section can also have a plurality of groove portions, which then preferably adjoin one another in a radial direction R of the pneumatic vehicle tire.

In a tire, the radial direction R is the direction which faces outward from the axis of rotation of the tire, which defines the axial direction A of the tire, i.e. the center, of the tire or of the hub of the rim supporting the tire, perpendicular to the axis of rotation. In this direction, the centrifugal force acts on the tire when a wheel equipped with the pneumatic utility vehicle tire rotates.

A groove portion of a cross section of a circumferential groove perpendicular to the circumferential direction of the tire is distinguished by a certain geometric shape of the cross section of the groove portion perpendicular to the tire circumferential direction, which clearly differs from the geometric shape of the cross section of another groove portion perpendicular to the tire circumferential direction. Therefore, if a circumferential groove has only one groove portion, its cross section perpendicular to the tire circumferential direction can be described by a geometric shape. Circumferential grooves having only one groove portion have, for example, a V-shaped or U-shaped cross section perpendicular to the tire circumferential direction.

The cross section of a groove portion perpendicular to the tire circumferential direction is delimited by two sides in the axial direction A. A groove portion in which these sides are almost or exactly parallel to the radial direction R has a U-shaped profile. In this groove portion, the tangent of the sides perpendicular to the circumferential direction encloses an angle which is not greater than 10° with the radial direction. In particular, the tangent can run parallel to the radial direction.

If, on the other hand, the two sides approach one another with increasing depth of the circumferential groove at an angle of more than 10° with respect to the radial direction R in a groove portion with increasing groove depth, the groove portion has a V-shaped cross section.

However, the cross section of a circumferential groove perpendicular to the circumferential direction can also be made up of a plurality of groove portions which adjoin one another in a radial direction R. The individual groove portions can be symmetrical to the radial direction here.

Circumferential grooves in the tread of a pneumatic vehicle tire, which have, in alternating fashion over the entire tire circumference over partial sections of the circumference of the pneumatic vehicle tire, a first cross section and a second cross section perpendicular to the circumferential direction, in which one or both cross sections are made up of two or more groove portions, which adjoin one another in a radial direction R, are known.

In a known form of such circumferential grooves 1 in a tread 2 of a pneumatic vehicle tire, which is shown as an example in FIG. 1 and is used primarily as an inner circumferential groove in the central region of the tread of a pneumatic vehicle tire, a first cross section, shown in the figure, perpendicular to the circumferential direction has a first groove portion 3, which is symmetrical to the radial direction $R_1$, shown in the figure by the arrow $R_1$, of the pneumatic vehicle tire. The groove portion has a constant width $B_{V,1}$ in the axial direction A of the pneumatic vehicle tire, which is also shown in the figure by the arrow A, with its sides running parallel to the radial direction $R_1$. The first groove portion therefore has a U-shaped cross section.

This first groove portion 3 is inwardly adjoined in the radial direction $R_1$ (counter to the arrow direction) by a second groove portion 4. This groove portion 4 has a cross section that is wider than the first groove portion 3 in the axial direction A and is the innermost groove portion of the circumferential groove, which also comprises the groove base of the cross section shown of the circumferential groove 1. This second groove portion 4 is also symmetrical to the radial direction $R_1$.

In addition, the first cross section shown in FIG. 1 has an outer, third groove portion 5 which is perpendicular to the circumferential direction of the circumferential groove 1 and ends on the surface of the tread 2 of the pneumatic vehicle tire. The cross section of the third groove portion 5 is widened outward symmetrically to the radial direction $R_1$ of the pneumatic vehicle tire and in the radial direction $R_1$, and therefore its width in the axial direction A increases from the width $B_{V,1}$ of the first groove portion 3 as far as the surface of the tread 2 up to the width $B_{V,O}$.

The second cross section of the known form of such circumferential grooves 1 has only one groove portion with an open V-shaped cross section.

The first cross section of the known form of a circumferential groove that is shown in FIG. 1 shows a reduced rolling resistance compared to other cross sections. This is based on the structure of the first groove portion. The latter has a maximum width of 3 mm in the axial direction A. The small width of the first groove portion in the axial direction ensures that the sides of the first groove portion touch when a cross section of the circumferential groove comes into contact with the roadway due to the vehicle weight, which compresses the rubber material of the tread. As a result, further deformation of the rubber material of the tread, particularly in the axial direction A, is prevented in this region of the circumferential groove. This significantly reduces the rolling resistance of the pneumatic vehicle tire. In addition, in this region, the reduced width $B_{V,O}$ of the circumferential groove on the surface of the tread and the resulting increased bearing surface of the tread as well as the touching of the sides of the groove result in a reduction in the contact pressure on the surface of the tread, which leads to a reduction in tire wear.

On the other hand, the behavior in the wet, in particular the braking behavior in the wet, is initially unfavorable in a new tire due to the compressed second groove portion and only improves with increasing tire wear, as a result of which the second groove portion with its widened cross section is then available as a reservoir for absorbing water from the roadway.

To compensate for this, the second cross section of the circumferential groove has only one groove portion with an open V-shaped cross section. Such a cross section of the circumferential groove is distinguished by a very good braking behavior in the wet. Owing to the fact that, in the circumferential groove, the two cross sections now alternate over the entire tire circumference over partial sections of the circumference of the pneumatic vehicle tire, reduced rolling resistance and good braking behavior in the wet can be achieved simultaneously with the circumferential groove. Nevertheless, such a circumferential groove achieves only a compromise, in which there are sacrifices in both properties.

Details of a very similar embodiment of such circumferential grooves with very similar properties are described in DE 10 2015 215 455 A1.

Another embodiment of circumferential grooves in the tread of a pneumatic vehicle tire, which have, in alternating fashion over the entire tire circumference over partial sections of the circumference of the pneumatic vehicle tire, a first cross section and a second cross section perpendicular to the circumferential direction, in which both cross sections are made up of a plurality of groove portions adjoining one another in a radial direction R, is known from WO 2017/174925 A1, where it is shown as an example of the described invention in FIG. 6. In a first cross section, there is then first of all a groove portion of constant width on the tread surface, which groove portion is adjoined inwardly in the radial direction by a further, second groove portion, the width of which widens steadily in the axial direction A inward to a maximum width. In the second cross section, on the other hand, there is a first groove portion, the cross section of which widens continuously outward perpendicular to the circumferential direction and ends in a wide groove portion of constant width in the axial direction A, which groove portion lies on the surface of the tread. Inwardly, in the radial direction, another small groove portion adjoins the first groove portion, which has a small, constant width over a small height in the radial direction R beyond the wear limit of the profile. An essential feature of the circumferential groove shown is that the height in the radial direction R of the second groove portion of the first cross section and the height in the radial direction R of the first groove portion of the second cross section largely comprise the profile depth of the circumferential groove. As a result, there is a continuous passage in the circumferential groove in the circumferential direction between these two groove portions of the two cross sections following one another in the circumferential direction, as a result of which drainage of liquid can take place in the circumferential groove between the two groove cross sections. Owing to the fact that the first groove portion comprises a large part of the profile depth of the circumferential groove in the second cross section, the stability and rigidity of this groove portion only increases after the outer groove portion of constant width and a considerable portion of the first groove portion have been worn away by tire abrasion, as a result of which the width of the circumferential groove on the tire surface has become smaller. The rolling resistance is thus improved in the region of the second cross section only after the tire has been used for a relatively long period of time because of the contour of the second cross section.

Likewise, a further embodiment of circumferential grooves in the tread of a pneumatic vehicle tire, which have, in alternating fashion over the entire tire circumference over partial sections of the circumference of the pneumatic vehicle tire, a first cross section and a second cross section perpendicular to the circumferential direction, in which both cross sections are made up of a plurality of groove portions adjoining one another in a radial direction R, is known from US 2020/0164694 A1. In a first cross section, there is then initially a groove portion of constant width on the tread surface, which groove portion is adjoined inwardly in the radial direction by a further, second groove portion, the width of which in the axial direction A first of all widens with increasing distance from the tread surface and then reduces again. In the case of the second cross section, on the other hand, there is a first groove portion, the cross section of which widens continuously outward in the circumferential direction as far as the surface of the tread. Inwardly, in the radial direction, a second small groove portion adjoins the first groove portion, which has a small, constant width over a small height in the radial direction R. The height of this portion in the radial direction is small compared to the height of the second groove portion in the radial direction of the first cross section. In the second cross section, this second groove portion is adjoined inwardly by a third groove portion, the width of which in the axial direction A widens again with increasing distance from the tread surface. As a result, there is a continuous passage in the circumferential groove in the circumferential direction between the second groove portion of the first cross section and the first and third groove portions of the second cross section in the two cross sections following one another over the circumference, as a result of which drainage of liquid can take place in the circumferential groove between the two groove cross sections. Due to the only very short length of the second groove portion of the second cross section, the stability and rigidity of the circumferential groove has been improved only to a limited extent in this second cross section. The sides of the circumferential groove are indeed compressed in the region of the second groove portion, but due to the small area of the abutting sides, the rubber material can still yield to the forces acting on it when the second cross section of the circumferential groove comes into contact with the roadway, in particular in the radial direction through the third groove portion, and is still subject to deformation. The circumferential groove therefore still has a considerable rolling resistance in the regions in which it has the second cross section.

The invention is based on the object of providing circumferential grooves for a pneumatic vehicle tire which continue to have good wet properties as a safety property and the rolling resistance of which is further reduced, in order thereby to achieve further fuel savings and thus an improved $CO_2$ balance for the vehicle on which the pneumatic vehicle tires are mounted.

SUMMARY OF THE INVENTION

The object is achieved by pneumatic vehicle tires, in particular utility vehicle tires, as claimed in claim 1.

Such a pneumatic vehicle tire is a pneumatic vehicle tire having a tread which has a profiling and which has at least one circumferential groove which runs in encircling fashion in the circumferential direction of the pneumatic vehicle tire and is formed to a profile depth PT and which has, in alternating fashion over the entire tire circumference over partial sections of the circumference of the pneumatic vehicle tire, a first cross section perpendicular to the circumferential direction, which is made up of at least two groove portions adjoining one another in a first radial direction $R_1$ of the pneumatic vehicle tire—a first groove portion which is symmetrical to the first radial direction $R_1$ and the width of which in the axial direction A of the pneumatic vehicle tire is less than 3 mm and does not vary by more than 10%, preferably does not vary by more than 2% and particularly preferably does not vary by more than 0.5%, and—a radially inner second groove portion which is wider in the axial direction A than the first groove portion and has the largest cross sectional area of all of the groove portions, and which is preferably also symmetrical to the first radial direction $R_1$, and a second cross section perpendicular to the circumferential direction, the second cross section being made up of at least two groove portions which adjoin one another in a second radial direction $R_2$ of the pneumatic vehicle tire and are symmetrical to the radial direction $R_2$— a first groove portion which widens outward, and an inner second groove portion which is narrower than the first groove portion and the width $B_{Y,2}$ of which varies in the axial direction A of the pneumatic vehicle tire by no more than 10%, preferably no more than 2% and particularly preferably no more than 0.5% and is less than 40%, preferably less than 30% and particularly preferably less than 25% of the width $B_{Y,O}$ in the axial direction A of the second cross section on the surface of the tread when the pneumatic vehicle tire is new, the second groove portion of the second cross section extending in the radial direction $R_2$ over at least 50% of the height $H2_y$ of the second groove portion of the first cross section in the radial direction $R_1$, and over at least 50% of its height $H2_Y$ in the radial direction $R_2$ is at a distance from the surface of the tread, at which the second groove portion is located in the first cross section.

A pneumatic vehicle tire according to the invention has treads having a profiling. This includes at least one circumferential groove in the circumferential direction of the pneumatic vehicle tire. It runs in encircling fashion and is formed to a profile depth PT. Correspondingly, each of these circumferential grooves has a profile depth PT over the entire tire circumference, although different circumferential grooves may have different profile depths PT.

A circumferential groove formed to a profile depth PT then has the same profile depth over the entire tire circumference, at least when the tire is new, with a tolerance of typically 0.10 to 0.15 mm, which is only due to production. Only if there are tread wear indicators in the circumferential groove can the profile depth deviate by the height of the tread wear indicators at these points. For example, the height of a tread wear indicator may be 1.2 mm. As an example of tread wear indicators, transverse webs are arranged uniformly over the circumference of the tire in a circumferential groove at the groove base.

At least one of these circumferential grooves of the profile of the tread has, in alternating fashion over the entire tire circumference over partial sections of the circumference of the pneumatic vehicle tire, a first cross section and a second cross section perpendicular to the circumferential direction of the pneumatic vehicle tire.

The first cross section of the circumferential groove perpendicular to the circumferential direction of the pneumatic vehicle tire is made up of at least two groove portions adjoining one another in a first radial direction $R_1$ of the pneumatic vehicle tire—a first and a second groove portion.

A first groove portion is symmetrical here to the first radial direction $R_1$. Owing to the symmetry of the cross section of the first groove portion perpendicular to the circumferential direction, the first radial direction $R_1$ is defined here. The width of the first groove portion in the axial direction A of the pneumatic vehicle tire is less than 3 mm. It varies by no more than 10%, preferably varies by no more than 2% and particularly preferably varies by no more than 0.5%. However, the width of the first groove portion can also be constant, in a very advantageous embodiment. Deviations beyond this in the width of the first groove portion are then due solely to the limits of the production of a circumferential groove. The resulting tolerance of the width of the first groove portion is typically less than 0.2 mm, preferably less than 0.15 mm and particularly preferably less than 0.05 mm.

The second groove portion of the first cross section of the circumferential groove is arranged radially inward in relation to the first groove portion, i.e. it directly adjoins the first groove portion in the radial direction $R_1$, the second groove portion being arranged closer to the center of the tire and conversely being at a greater distance from the tread surface than the first groove portion. Furthermore, the second groove portion of the first cross section is wider in the axial direction A than the first groove portion. That is to say, it has a width in the axial direction A that is greater than the maximum width of the first groove portion. The second groove portion preferably has a width in the axial direction A which is greater than the maximum width of the first groove portion over a greater extent in the first radial direction $R_1$ or a larger region of the distance of the circumferential groove from the tread surface, the depth of the circumferential groove. Typically, the second groove portion has a width in the axial direction A which is greater than the maximum width of the first groove portion over an extent in the radial direction $R_1$ of at least 3 cm, preferably at least 4.5 cm and particularly preferably at least 5.5 cm. In addition, the second groove portion typically has a width in the axial direction A which is greater than the maximum width of the first groove portion over at least 50% of its maximum extent in the radial direction $R_1$, preferably over 75% of its maximum extent in the radial direction $R_1$ and particularly preferably over 90% of its maximum extent in the radial direction $R_1$. Furthermore, the second groove portion of the first cross section of the circumferential groove perpendicular to the circumferential direction of the pneumatic vehicle tire has the largest cross-sectional area perpendicular to the circumferential direction of all of the groove portions of the first cross section.

In a preferred embodiment, the second groove portion of the first cross section of the circumferential groove is also symmetrical to the first radial direction $R_1$.

The second cross section of the circumferential groove perpendicular to the circumferential direction of the pneumatic vehicle tire is also made up of at least two groove portions adjoining one another in a second radial direction $R_2$ of the pneumatic vehicle tire—a first and a second groove portion. These are both symmetrical to the radial direction $R_2$.

The first groove portion of the second cross section perpendicular to the circumferential direction widens outward. That is to say that, as the distance from the surface of the tread of the pneumatic vehicle tire decreases, or with a small depth of the circumferential groove, in this groove portion its width in the axial direction A increases.

The second groove portion of the second cross section perpendicular to the circumferential direction is narrowed and on the inside in relation to the first groove portion of the second cross section. That is to say, the width in the axial direction A of the second groove portion is not greater than the smallest width in the axial direction A of the first groove portion. This is the case with the first groove portion at its greatest distance from the surface of the tread of the pneumatic vehicle tire, or at its greatest depth, since it widens outward. This is exactly where the first groove portion is adjoined in the second radial direction $R_2$ by the second groove portion, which is on the inside compared to the first groove portion. The second groove portion is arranged closer to the center of the tire and, conversely, is at a greater distance from the tread surface than the first groove portion.

The width of the second groove portion in the axial direction A of the pneumatic vehicle tire varies by no more than 10%, preferably no more than 2% and particularly preferably no more than 0.5%. However, the width of the second groove portion can also be constant, in a very advantageous embodiment. Deviations beyond this in the width of the second groove portion are then due solely to the limits of the production of a circumferential groove. The resulting tolerance of the width of the second groove portion is typically less than 0.2 mm, preferably less than 0.15 mm and particularly preferably less than 0.05 mm.

In this case, the width of the second groove portion of the second cross section in the axial direction A is less than 40%, preferably less than 30% and particularly preferably less than 25% of the width $B_{Y,O}$ in the axial direction A of the second cross section on the surface of the tread when the pneumatic vehicle tire is new. The width of the second groove portion of the second cross section in the axial direction is thus significantly reduced compared to the original width of the second cross section of the circumferential groove on the tread surface of the new pneumatic vehicle tire.

The second groove portion of the second cross section extends in the radial direction $R_2$ over at least 50% of the height of the second groove portion of the first cross section in the radial direction $R_1$.

The height H of a groove portion of a cross section of a circumferential groove in a radial direction R of the cross section is defined as the maximum height of the cross-sectional area of the groove portion in the direction of the radial direction R and is given by the maximum distance between two points of the edge of the cross-sectional area, which they are at from one another only in the radial direction R. Their distance perpendicular to the radial direction is not considered here. With many cross-sectional areas of a groove portion that are present in the cross sections perpendicular to the circumferential direction of a circumferential groove of a pneumatic vehicle tire according to the invention, this maximum distance can be found precisely in the radial direction R. However, it can also be found on a straight line that runs parallel to the radial direction R at a certain distance in the axial direction A if the two edge points that are at the maximum distance from one another in the radial direction R lie on this straight line. However, should the two points not be on a straight line parallel to the radial direction R, their distance in the axial direction A is not taken into account when determining the height of the groove portion.

The length of the second groove portion of the second cross section in the radial direction of the cross section $R_2$, the width of which in the axial direction varies by at most 10%, and thus its height in the radial direction $R_2$, is thus coupled to the height of the second groove portion of the first cross section, specifically in such a way that its length corresponds at least to half the height of the second groove portion of the first cross section in the radial direction of the first cross section $R_1$.

In addition, the second groove portion of the second cross section of the circumferential groove over at least 50% of its height in the radial direction $R_2$ is at a distance from the surface of the tread, at which the second groove portion is located in the first cross section. The distance from the surface of the tread for a location in a circumferential groove corresponds to the depth of the circumferential groove at this location. The second groove portion of the second cross section is thereby located at the depth of the circumferential groove, at which the second groove portion is located in the first cross section, over at least 50% of its height. Both groove portions, the second groove portion of the second cross section and the second groove portion of the first cross section, are thus located over a greater extent of the second groove portion of the second cross section, namely over at least 50% of the extent of the second groove portion of the second cross section, in the region of the same depth of the circumferential groove, albeit in different partial sections of the circumference.

The improved geometry of the second cross section of the circumferential groove perpendicular to the circumferential direction improves the rolling resistance of the circumferential groove in the region of the second cross section without significantly reducing the behavior in the wet of the second cross section compared to the solutions known from the prior art of circumferential grooves in a vehicle tread with cross sections alternating over the tire circumference. This is achieved in that the second groove portion of the second cross section is narrowed compared to the first groove portion to a width in the axial direction A, which is significantly reduced compared to the width of the second cross section on the tread surface. It extends in the radial direction $R_2$ to a significant length making up at least 50% of the height of the second groove portion of the first cross section. The second groove portion here is only positioned at a depth of the circumferential groove that is at least 50% of its height in the radial direction $R_2$ at the same depth as the second groove portion of the first cross section, which serves as a reservoir for absorbing water from the roadway. Thus, the first groove portion of the second cross section of the circumferential groove is at maximum in a depth of the circumferential groove at which at most the upper 50% of the height of the second groove portion is located in the first cross section of the circumferential groove, or only at maximum in the depth of a groove portion of the first cross section, which is at a smaller distance to the tread surface than the second groove portion of the first cross section, such as in particular the first groove portion of the first cross section. Since the sides of the first groove portion now converge with increasing circumferential groove depth and end in the narrowed groove portion of reduced width, the sides of the second groove portion are already compressed at a lower depth of the circumferential grooves in comparison to the circumferential grooves known from the prior art in the second cross section, and therefore said sides touch. The resultingly reduced deformation of the tread at a lower depth further improves the rolling resistance of the pneumatic vehicle tire and increases the rigidity of the cross section. This effect is already used in a pneumatic vehicle tire according to the invention when it is new. Nevertheless, the first groove portion of the second cross section and its groove portions, which may be arranged on the outside in the radial direction, offer sufficient capacity to receive water from the roadway and ensure good behavior in the wet of the circumferential groove, such that the vehicle safety is ensured by good braking behavior in wet conditions.

Owing to the fact that over 50% of the height the second groove portion of the second cross section is located in the depth of the circumferential groove in which the second groove portion is located in the first cross section, an exchange of water from the roadway between the partial sections of the two cross sections between the second groove portions of both cross sections is also possible if there is also a transition between these groove portions of both cross sections in the circumferential direction. In this way, water can get through the narrowed second groove portion of the second cross section into the second groove portion of the first cross section, from which it can then escape again from the circumferential groove as soon as its partial section of the circumferential groove no longer touches the roadway. Further details will be explained further below.

In a preferred embodiment, the second groove portion of the second cross section of the at least one circumferential groove extends in the radial direction $R_2$ over at least 80% of the height of the second groove portion of the first cross section in the radial direction $R_1$. The length of the second groove portion of the second cross section in the radial direction of the cross section $R_2$, and thus its height in the radial direction $R_2$, is therefore dimensioned according to the height of the second groove portion, specifically in such a way that its length corresponds to at least 80% of the height of the second groove portion of the first cross section in the radial direction of the first cross section $R_1$.

In a particularly preferred embodiment, the second groove portion of the second cross section extends in the radial direction $R_2$ in the radial direction $R_2$ over at least the height of the second groove portion of the first cross section in the radial direction $R_1$. The length of the second groove portion of the second cross section in the radial direction of the cross section $R_2$, and thus its height in the radial direction $R_2$, is therefore dimensioned according to the height of the second groove portion, specifically in such a way that its length corresponds to at least the height of the second groove portion of the first cross section in the radial direction of the first cross section $R_1$.

Typically, the second groove portion of the second cross section of the at least one circumferential groove extends in the radial direction $R_2$ over at most 125% of the height of the second groove portion of the first cross section in the radial direction $R_1$, preferably over at most 115% of the height of the second groove portion of the first cross section in the radial direction $R_1$ and particularly preferably over at most 110% of the height of the second groove portion of the first cross section in the radial direction $R_1$. The height of the second groove portion of the second cross section in the radial direction $R_2$ should not be too large so that the groove portions, which are at a smaller distance from the tread surface than the second groove portion, such as in particular the first groove portion with a given profile depth PT, have enough depth to sufficiently absorb water from the roadway and thus contribute to the braking behavior of the pneumatic vehicle tire in the wet.

In a preferred embodiment, the second groove portion of the second cross section of the at least one circumferential groove in at least 75% of its height in the radial direction $R_2$ is at a distance from the surface of the tread, at which the second groove portion is located in the first cross section. In a particularly preferred embodiment, the second groove portion of the second cross section over its entire height in the radial direction $R_2$ is at a distance from the surface of the tread, at which the second groove portion is located in the first cross section. The greater the range of the distance from the surface, i.e. the range of the depth, in which both the second groove portion of the first cross section and the second groove portion of the second cross section are present, the more water from the roadway from the second cross section can get into the second groove portion of the first cross section and thus the behavior in the wet of the pneumatic vehicle tire can be improved.

Typically, in the at least one circumferential groove of the pneumatic vehicle tire, the height of the first and second groove portions of the first cross section in the radial direction $R_1$ together is greater than 70% of the circumferential groove profile depth PT, preferably greater than 80% of the circumferential groove profile depth PT, particularly preferably greater than 85% of the circumferential groove profile depth PT and most preferably greater than 90% of the circumferential groove profile depth PT. Here, the first cross section also has at least one additional groove portion that is at a small distance from the tread surface than the first and second groove portions, unless the height of the first and second groove portions of the first cross section already corresponds to the profile depth PT. The first groove portion then ends at the tread surface. If at least one further groove portion also belongs to the first cross section of the circumferential groove, this preferably has a greater width in the axial direction A than the first groove portion in order to improve the behavior in the wet of the pneumatic vehicle tire through a greater absorption capacity of water from the roadway.

In a preferred embodiment, in the case of the at least one circumferential groove, the base region of the circumferential groove inwardly directly adjoins the second groove portion of the second cross section in the radial direction $R_2$. The base region of the circumferential groove comprises the groove base with the deepest point of the circumferential groove, which is at the greatest distance from the tread surface. This distance corresponds to the profile depth PT. From the deepest point of the circumferential groove, the width of the circumferential groove in the axial direction A increases steadily with decreasing depth, i.e. decreasing distance from the tread surface, in the base region of the circumferential groove, until the base region reaches the width of the second groove portion of the second cross section in the axial direction A. In one embodiment, the base region already has a width in the axial direction A at the deepest point of the circumferential groove. Then the groove base is formed by a straight line parallel to the axial direction A, which has the profile depth PT, and the base region of the second cross section of the transverse groove is formed by a surface in the axial direction A along the circumferential direction. This surface then preferably transitions via a curvature into the sides of the cross-sectional area of the second groove portion of the second cross section.

Preferably, the base region of the second cross section of the circumferential groove is symmetrical to the radial direction $R_2$. In a particularly preferred embodiment, the base region of the second cross section merges from the deepest point of the circumferential groove with a constant radius of curvature into the second groove portion of the second cross section. This radius of curvature results from the width $B_{Y,2}$ of the second groove portion in the axial direction A by being half of the width $B_{Y,2}$. Then, the cross section of the bottom region perpendicular to the circumferential direction is a semicircle with a diameter which corresponds to the width $B_{Y,2}$ of the second groove portion in the axial direction A at the end of the second groove portion adjacent to the base region, i.e., the end furthest away from the tread surface.

The overall height of the second groove portion of the second cross section and of the base region of the circumferential groove in the radial direction $R_2$ typically differs in these embodiments from the distance between the edge points of the cross-sectional area of the second groove portion of the first cross section perpendicular to the circumferential direction with the greatest distance from the radial direction $R_1$ and the deepest point of the cross-sectional area in the radial direction $R_1$ by no more than 20%, preferably by no more than 10% and particularly preferably by no more than 5%. Then, the sum of the height $H2_Y$ of the second groove portion of the second cross section in the radial direction $R_2$ and the height of the base region of the second cross section in the radial direction $R_2$, which corresponds to the distance of the deepest point from the inner end of the second groove portion, approximately corresponds to the distance of the depth of the widest extent of the second groove portion of the first cross section from the groove bottom of the first cross section, at which its deepest point lies. Since the profile depth of the transverse groove is the same over the entire tire circumference, the second groove portion and the base region of the second circumferential groove are therefore then at the same depth as the region of the second groove portion below its greatest extent in the axial direction A. These regions of the two cross sections of the circumferential groove can thus communicate with one another through a corresponding transition region between the cross sections, such that in wet conditions water from the roadway that gets into the second groove portion of the second cross section can pass into the second groove portion of the first cross section, in particular by the rotation of the tire. This significantly improves the water absorption capacity of the circumferential groove.

In the embodiments in which, in the case of the at least one circumferential groove, the base region of the circumferential groove directly inwardly adjoins the second groove portion of the second cross section in the radial direction $R_2$, the mean width $B_{Y,2}$ in the axial direction A of the second groove portion of the second cross section is typically 2 mm to 6 mm, preferably 2.5 mm to 4 mm and particularly preferably 2.8 mm to 3.5 mm. With such a width, then in the second cross section, the sides of the second groove portion are compressed such that they touch, as a result of which flexing of the rubber material of the tread in the region of the second cross section of the circumferential groove is significantly reduced. The rolling resistance of the pneumatic vehicle tire according to the invention is then also correspondingly reduced by this dimensioning.

Furthermore, in the embodiments in which, in the case of the at least one circumferential groove, the base region of the circumferential groove directly inwardly adjoins the second groove portion of the second cross section in the radial direction $R_2$, the ratio of the maximum width $B_{V,2,max}$ in the axial direction A of the cross-sectional area of the second groove portion of the first cross section to the mean width $B_{Y,2}$ in the axial direction A of the second groove portion of the second cross section is typically between 1.5 and 4.5, preferably between 2.0 and 3.5 and particularly preferably between 2.3 and 2.8. This ratio of the width of the inner groove portions of both cross sections is selected in particular in such a way that the behavior in the wet and the rolling resistance of the circumferential groove are optimized at the same time.

In addition, in the embodiments in which, in the case of the at least one circumferential groove, the base region of the circumferential groove directly inwardly adjoins the second groove portion of the second cross section in the radial direction $R_2$, the ratio of the mean width $B_{Y,2}$ in the axial direction A of the second groove portion of the second cross section to the mean width $B_{Y,1}$ in the axial direction A of the first groove portion of the first cross section is between 1.0 and 6.0, preferably between 2.0 and 4.5 and particularly preferably between 2.3 and 3. Owing to the nevertheless significantly larger width $B_{Y,2}$ of the second groove portion of the second cross section, it is ensured that water from the roadway can be absorbed by the second groove portion of the second cross section and can then pass into the second groove portion of the first cross section.

In another embodiment, in the case of the at least one circumferential groove, a third groove portion inwardly directly adjoins the second groove portion of the second cross section in the radial direction $R_2$, the third groove portion comprising the base region of the second cross section and being droplet-shaped, with its maximum width $B_{Y,3}$ in the axial direction A being greater than the mean width $B_{Y,2}$ in the axial direction A of the second groove portion of the second cross section. The third groove portion of the second cross section is at a greater distance from the tread surface than the second groove portion of the second cross section, with the second groove portion merging into the third groove portion. The width of the third groove portion increases in the axial direction up to its maximum width $B_{Y,3}$. Since it is droplet-shaped, however, it tapers with increasing depth, i.e. increasing distance from the tread surface, as far as the deepest point of the circumferential groove at the groove bottom. The groove bottom can also be a straight line in the axial direction A, which is at the greatest distance from the tread surface, which then takes on the role of the deepest point of the circumferential groove. The width of the third groove portion is greater than that of the second groove portion and it can then, in particular, have a greater volume for absorbing water from the roadway entering the second groove bottom. By means of a connection to the second groove portion of the first cross section in the transition region between the two cross sections present in the circumferential grooves, this absorbed water from the roadway, in particular owing to the rotation of the pneumatic vehicle tire, can then also pass into the second groove portion of the first cross section, which has an even larger volume for absorbing water from the roadway.

In a preferred embodiment, in the case of the at least one circumferential groove, the edge of the cross-sectional area of the third groove portion of the second cross section perpendicular to the circumferential direction is circular with a diameter $B_{Y,3}$, which is greater than the mean width $B_{Y,2}$ in the axial direction A of the second groove portion of the second cross section. Typically, the diameter $B_{Y,3}$ of the circular edge of the cross-sectional area of the third groove portion of the second cross section is 1.2 times to 4 times as large, preferably 2 times to 3 times as large and particularly preferably 2.3 times to 2.7 times as large as the mean width $B_{Y,2}$ in the axial direction A of the second groove portion of the second cross section. In such a particularly preferred embodiment, the second groove portion of the second cross section extends in the radial direction $R_2$ over a length $H2_Y$, which is at least as large as the diameter $B_{Y,3}$ of the circular edge of the cross-sectional area of the third groove portion, preferably 15% larger than the diameter $B_{Y,3}$ of the circular edge of the cross-sectional area of the third groove portion and particularly preferably 25% larger than the diameter $B_{Y,3}$ of the circular edge of the cross-sectional area of the third groove portion. The length $H2_Y$ in the radial direction $R_2$ of the second groove portion corresponds here to the height of the second groove portion in the radial direction $R_2$. Here, the second groove portion, owing to its small width in the axial direction A, is considered to be a channel in the radial direction $R_2$, which guides water from the roadway into the circular droplet of the third groove portion and has a certain length $H2_Y$.

In the embodiments in which, in the case of the at least one circumferential groove, a third groove portion, which comprises the base region of the second cross section and is droplet-shaped, directly inwardly adjoins the second groove portion of the second cross section in the radial direction $R_2$, typically the mean width $B_{Y,2}$ of the second groove portion in the axial direction A of the pneumatic vehicle tire of the second cross section is less than 15%, preferably less than 12% and particularly preferably less than 10% of the width $B_{Y,O}$ in the axial direction A of the second cross section on the surface of the tread when the pneumatic vehicle tire is new.

Furthermore, in these embodiments, the width $B_{Y,2}$ of the second groove portion in the axial direction A of the pneumatic vehicle tire of the second cross section is typically greater than 4%, preferably greater than 6% and particularly preferably greater than 8% of the width $B_{Y,O}$ in the axial direction A of the second cross section on the surface of the tread when the pneumatic vehicle tire is new. In these embodiments, this ratio of the width $B_{Y,2}$ of the second groove portion to the width $B_{Y,O}$ is selected for the second cross section of the circumferential grooves in particular such that the behavior in the wet and the rolling resistance of the circumferential grooves are optimized at the same time.

In the embodiments in which, in the case of the at least one circumferential groove, a third groove portion directly inwardly adjoins the second groove portion of the second cross section in the radial direction $R_2$, said third groove portion comprising the base region of the second cross section and being droplet-shaped, the mean width $B_{Y,2}$ in the axial direction A of the second groove portion of the second cross section is typically 0.7 mm to 2.5 mm, preferably 1 mm to 1.7 mm and particularly preferably 1.1 mm to 1.3 mm.

In the embodiments in which, in the case of the at least one circumferential groove, a third groove portion, which comprises the base region of the second cross section and is droplet-shaped, directly inwardly adjoins the second groove portion of the second cross section in the radial direction $R_2$, the second groove portion of the second cross section in the radial direction $R_2$ typically extends over a length $H2_Y$ of 2 mm to 6 mm, preferably over a length of 2.7 mm to 4.5 mm and particularly preferably over a length of 3.2 mm to 4 mm. This dimensioning of the second groove portion promotes the reduction in the rolling resistance of the pneumatic vehicle tires according to the invention.

In one embodiment of the pneumatic vehicle tire according to the invention, the first groove portion of the second cross section of the at least one circumferential groove widens constantly outward. The sides of the cross-sectional area of the first groove portion perpendicular to the circumferential direction are then formed by straight lines and the cross-sectional area of the first groove portion then has the shape of an isosceles trapezoid. In this case, the sides of the cross-sectional area perpendicular to the circumferential direction of the pneumatic vehicle tire of the first groove portion of the second cross section typically have an inclination of 20° to 80°, preferably an inclination of 30° to 60° and particularly preferably an inclination of 40° to 50° in relation to the radial direction $R_2$.

The second groove portion of the first cross section of the circumferential grooves may, in certain embodiments, have sides which are partially formed as a straight line and which converge inward in the radial direction $R_1$, i.e. with increasing distance from the tread surface. Then, typically, the ratio of the angle of inclination of the straight-line sides of the cross-sectional area perpendicular to the circumferential direction of the pneumatic vehicle tire of the first groove portion of the second cross section in relation to the radial direction $R_2$ to the angle of inclination of the sides, converging inwardly in the radial direction $R_1$, of the cross-sectional area perpendicular to the circumferential direction of the second groove portion of the first cross section in relation to the radial direction $R_1$ is between 1.5 and 10, preferably between 1.75 and 4 and particularly preferably between 2 and 2.5. The sides of the first groove portion of the second cross section thus have a significantly greater inclination than the sides of the second groove portion of the first cross section. Owing to this large inclination of the sides of the first groove portion of the second cross section, the rolling resistance of the tread of the pneumatic vehicle tire in the region of the second cross section is reduced in a targeted manner compared to the prior art, since the rubber material of the tread is already present closer to the surface of the tread, such that it has increased rigidity and is less flexed when the tire revolves when in contact with the roadway.

In a pneumatic vehicle tire according to the invention, in the case of the at least one circumferential groove, the ratio of the area of the cross-sectional area perpendicular to the circumferential direction of the second groove portion of the first cross section to the area of the cross-sectional area perpendicular to the circumferential direction of the second groove portion of the second cross section is between 1 and 3, preferably between 1.5 and 2.5 and particularly preferably between 2 and 2.3. The area of the second groove portion of the second cross section is thus preferably significantly smaller than that of the second groove portion of the first cross section, since their sides are intended to be compressed when in contact with the roadway. On the other hand, however, the area of the second groove portion of the second cross section is of such a size that a certain amount of water from the roadway in wet conditions can still be absorbed in the second groove portion of the second cross section before its sides are compressed. As a result, the absorbed water is pressed into the second groove portion of the first cross section, which has a greater absorption capacity for the water.

In a preferred embodiment of the pneumatic vehicle tire, the partial sections of the at least one circumferential groove, which have the first cross section perpendicular to the circumferential direction, all have the same length in the circumferential direction, and likewise the partial sections of the circumferential grooves, which have the second cross section perpendicular to the circumferential direction, all have the same length in the circumferential direction. Typically, the portion of the length of the partial sections of the circumference of the pneumatic vehicle tire, in which a circumferential groove has the first cross section, in relation to the overall length of the circumferential groove is between 25% and 75%, preferably between 30% and 70%, and particularly preferably between 40% and 60%.

Typically, the portion of the length of the partial sections of the circumference of the pneumatic vehicle tire, in which a circumferential groove has the first cross section, in relation to the overall length of the partial sections of the circumference of the pneumatic vehicle tire of a circumferential groove, in which the circumferential groove has the first cross section or second cross section, is between 40% and 85%, preferably between 60% and 80%, and particularly preferably between 70% and 78%. Particularly preferably, the overall length of the partial sections in which the circumferential groove has the first cross section is three times the overall length of the partial sections in which the circumferential groove has the second cross section. Correspondingly, the first cross section then extends over three times the length in the circumferential direction compared to the second cross section in the case of a circumferential groove. The length in the circumferential direction over which the first and the second cross section extend can be different or else the same if there is a plurality of circumferential grooves. Depending on the geometry of the first and second cross section, it may be advantageous for the cross sections to extend over the same length in the circumferential direction and different lengths in the circumferential direction, so that the pneumatic vehicle tire has the best possible behavior in the wet along with reduced rolling resistance.

In further preferred embodiments of the pneumatic vehicle tire, in the case of the at least one circumferential groove, the cross section of the circumferential groove is V-shaped in the transition regions between a partial section with the first cross section and a partial section with the second cross section. This makes it particularly readily possible for water from the roadway absorbed by the second groove portion of the cross section to pass into the second groove portion of the first cross section with its large absorption capacity via the V-shaped transition region. Owing to a limited length $L3_Y$ of the transition region, in which the second narrowed groove portion of the second cross section is not fully developed, the increased rolling resistance of the V-shaped cross section is not particularly significant in the circumferential direction. The length $L3_Y$ of a transition region is generally typically 3% to 30%, preferably 10% to 25% and particularly preferably 15% to 20% of the length $L1_Y$ of the partial section with the first cross section on the tread surface.

Typically, in the case of the at least one circumferential groove, the overall length of partial sections of the circumference of the pneumatic vehicle tire, in which the at least one circumferential groove has the first cross section or second cross section, makes up 50% to 90% of the overall length of the circumferential groove in the circumferential direction, preferably 60% to 80% of the overall length of the circumferential groove in the circumferential direction, and particularly preferably 65% to 70% of the overall length of the circumferential groove in the circumferential direction.

In a preferred embodiment, a pneumatic vehicle tire according to the invention has two adjacent circumferential grooves which have, in alternating fashion over the entire tire circumference over partial sections of the circumference of the pneumatic vehicle tire, a previously described first cross section and second cross section perpendicular to the circumferential direction. In this case, all of the partial sections of the first cross section and the partial sections of the circumferential grooves that do not have the first cross section, but rather two transition regions between the two cross sections and the partial section, which has the second cross section, of the two circumferential grooves have the same length, with the arrangement of these partial sections on the two circumferential grooves preferably being such that if, in the case of one of the two circumferential grooves, the first cross section of the circumferential groove is present, in the same partial section, i.e. in the partial section with the same circumferential position, of the other circumferential groove the partial section is present, which does not have the first cross section of the circumferential groove, but rather the partial section with the second cross section and the two transition regions between the two cross sections. These partial sections are therefore arranged at the same points on the circumference in the case of the two adjacent circumferential grooves, but the circumferential grooves here have the two different cross sections. In one circumferential position, one transverse groove then has the first cross section and the other has the second or a transition region between the two cross sections, the first and the second cross section. In the next partial section which follows in the circumferential direction and has the cross sections, the cross sections have then been interchanged between the two circumferential grooves. Thus, as viewed in the axial direction A, there is always a circumferential groove with the first and one with the second cross section or a transition region. This arrangement is very advantageous since the vehicle tire has good and uniform behavior in the wet and improved uniform rolling resistance both in the circumferential direction and in the axial direction A.

If the length of the partial sections in the circumferential direction differs in the case of the at least one circumferential groove over which the first and the second cross section of the circumferential groove extend, a preferred embodiment has two adjacent circumferential grooves in which the partial sections of the first and the second cross section are then arranged on the two circumferential grooves in such a manner that the center of one partial section in the circumferential direction of the first cross section is arranged on one of the two circumferential grooves in the circumferential direction such that on the other of the two circumferential grooves in the circumferential direction the center of a partial section which has the second cross-sectional profile is arranged at the same location in the circumferential direction. In this embodiment, the centers of the partial sections having a cross section over the circumference are positioned at the same locations of the two adjacent circumferential grooves. However, the two adjacent circumferential grooves each have a different cross section at these locations, one circumferential groove having the first cross section and the other the second cross section. This arrangement of the cross sections also means that the pneumatic vehicle tire has good wet performance and reduced rolling resistance, consistently both over the circumference and in the axial direction.

In a preferred embodiment, the cross-sectional area of the second groove portion of the first cross section of the at least one circumferential groove comprises the bottom region of the circumferential groove, which has an edge without corners. This then reduces the risk of groove fractures in the first cross section.

In another embodiment, the second cross section of the at least one circumferential groove is made up only of the first groove portion and the second groove portion. Then, as previously described, the base region of the circumferential groove inwardly adjoins the second groove portion.

In another embodiment, the second cross section of the at least one circumferential groove is made up only of the first groove portion, the second groove portion and the droplet-shaped third groove portion, which encompasses the base region and for which advantageous configurations have already been described above.

In one embodiment of the pneumatic vehicle tire according to the invention, in the case of at least one circumferential groove, a fourth groove portion, the width of which in the axial direction A is widened outward from the maximum width $B_{Y,1\ max}$ of the first groove portion of the second cross section by no more than 40%, preferably by no more than 10%, and particularly preferably by no more than 0.5%, outwardly adjoins the first groove portion of the second cross section in the radial direction $R_2$ toward the surface of the tread of the pneumatic vehicle tire. The fourth groove portion is primarily intended to absorb larger amounts of water from the roadway and, in contrast to the first groove portion, contributes little to reducing the rolling resistance in the region of the circumferential grooves. Preferably, the fourth groove portion also ends at the surface of the tread. In addition, the fourth groove portion can also preferably have a constant width in the axial direction A over its height $H4_Y$ in the radial direction $R_2$.

The height $H4_Y$ of the fourth groove portion of the second cross section in the radial direction $R_2$ is typically less than 40% of the profile depth PT, preferably less than 10% of the profile depth PT and particularly preferably less than 5% of the profile depth PT.

The height $H4_Y$ of the fourth groove portion of the second cross section is typically than 5 mm, preferably less than 3 mm and particularly preferably less than 1 mm.

In one embodiment, the second cross section is made up only of the first groove portion, the second groove portion, the third groove portion described above and the fourth groove portion. Detailed configurations of these groove portions of the second cross section of the at least one circumferential groove have been described above.

In one embodiment, in the case of at least one circumferential groove, the first cross section perpendicular to the circumferential direction, starting at the outer surface of the tread, is made up of three groove portions which adjoin one another in a first radial direction $R_1$ of the pneumatic vehicle tire and are symmetrical to the radial direction $R_1$, with a third groove portion beginning on the outer surface of the tread, widening outward and the first groove portion adjoining the third groove portion narrowing in relation thereto.

In this case, the third groove portion of the first cross section preferably constantly widens outward. The ratio of the angle of inclination of the sides of the cross-sectional area perpendicular to the circumferential direction of the pneumatic vehicle tire of the first groove portion of the second cross section in relation to the radial direction $R_2$ to the angle of inclination of the sides of the cross-sectional area perpendicular to the circumferential direction of the pneumatic vehicle tire of the third groove portion of the first cross section in relation to the radial direction $R_1$ then typically has a value between 0.9 and 1.4, preferably between 1 and 1.3 and particularly preferably between 1.1 and 1.2.

In general, it should be mentioned again that, owing to the geometry of the second cross section of the at least one transverse groove of the pneumatic vehicle tire according to the invention, the sides of its second groove portion touch each other more quickly when the cross section comes into contact with the roadway than in the case of the corresponding (second) cross sections known from the prior art. This reduces the deformation of the rubber material in the region of the transverse grooves and increases the rigidity of the tread in this region. As a result, the energy input into the rubber material of the pneumatic vehicle tire due to its rolling movement is reduced and thus so too is the rolling resistance of the pneumatic vehicle tire. In addition, the geometry of the circumferential grooves of the pneumatic vehicle tires according to the invention is designed in such a way that water from the roadway can be transported between the second groove portions of both cross sections. As a result, there is a drainage system for water in the circumferential grooves, which improves the behavior in the wet and in particular the water absorption capacity of the pneumatic vehicle tires according to the invention. In particular, the pneumatic vehicle tires according to the invention can be used in trucks in which the reduced rolling resistance can reduce the fuel consumption and a high level of vehicle safety is nevertheless provided because of good behavior in the wet, in particular also good braking behavior in wet conditions, to which the increased absorption capacity of water from the roadway contributes. With the aid of the specified embodiments, these properties can be specifically optimized as needed.

BRIEF DESCRIPTION OF THE DRAWINGS

The invention will be explained in more detail by way of a number of exemplary embodiments, in which.

DETAILED DESCRIPTION OF THE INVENTION

First of all, an embodiment of the prior art will be described here once again, before various embodiments of the invention are then explained. What is important here is that both cases involve pneumatic vehicle tires that have one or more circumferential grooves which have a first and second cross section over different partial sections of the circumference.

Figure 1:
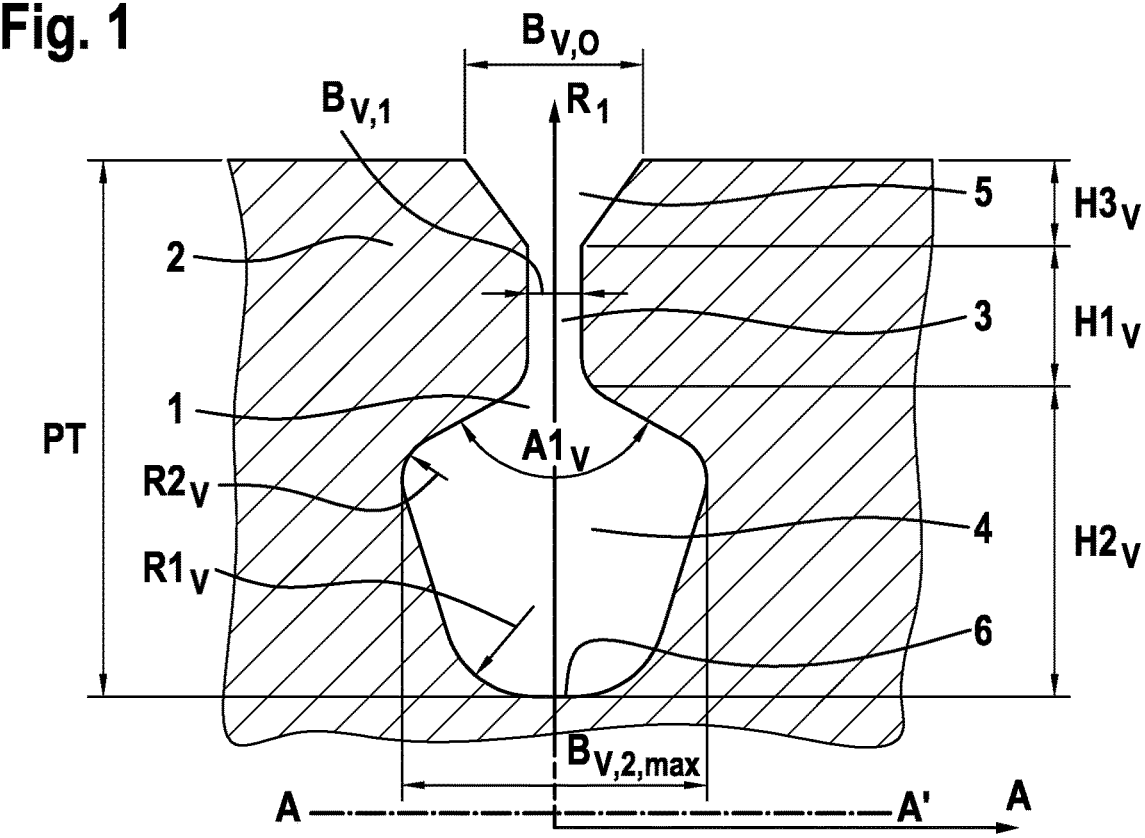
FIG. 1: shows a first cross section of a circumferential groove with three groove portions

First of all, FIG. 1 shows a first cross section of a circumferential groove, which is present or may be present both in the prior art and in the embodiments according to the invention. This cross section has already been briefly explained before. FIG. 1 shows a circumferential groove 1 which is arranged in a tread 2 of the pneumatic vehicle tire. The cross section shown of the circumferential groove has three groove portions. A first groove portion 3 has a constant width $B_{V,1}$ of 1.2 mm.

This groove portion is symmetrical to the radial direction $R_1$. A second groove portion 4 inwardly adjoins in the radial direction $R_1$. That is to say that this groove portion 4 is at a greater distance from the surface of the tread 2 than the first groove portion 3. In this groove portion 4, too, the cross section perpendicular to the circumferential direction is symmetrical to the radial direction $R_1$ of that of the first cross section of the circumferential groove 1. The second groove portion 4 here has a maximum width $B_{V,2,max}$ of 7.5 mm.

Furthermore, the second groove portion 4 comprises the base region 6 of the first cross section of the circumferential groove 1. The base region 6 merges with a radius of curvature $R1_V$ of 1.5 mm into straight sides of the second groove portion 4 that, as the depth of the circumferential groove increases, converge in the radial direction $R_1$. Typically, the value of the radius of curvature $R1_V$ is between 0.8 mm and 2.5 mm, preferably between 1 mm and 2 mm and particularly preferably between 1.3 mm and 1.7 mm. Starting from the first groove portion 3, the second groove portion 4 opens at an angle $A1_V$ of 120° as the depth of the circumferential groove increases. In the example shown, the second groove portion 4 then opens up to the maximum width $B_{V,2,max}$. The opening angle $A1_V$ of the second groove portion 4 is typically 90° to 180°, preferably 110° to 160° and particularly preferably 115° to 140°. The height $H2_V$ of the second groove portion 4 is 6.5 mm. Typically, the height $H2_V$ of the second groove portion 4 is 40% to 70% of the profile depth PT of the circumferential groove, preferably 45% to 65% of the profile depth PT and particularly preferably 50% to 60% of the profile depth PT. Typically, the height $H2_V$ of the second groove portion 4 is 2.4 mm to 12.5 mm, preferably 3.6 mm to 10.5 mm and particularly preferably 5 mm to 8.5 mm.

In an inventive embodiment, the height $H1_V$ of the first groove portion 3 of the first cross section is typically between 20% and 60% of the profile depth PT, preferably 25% to 55% of the profile depth PT and particularly preferably 35% to 50% of the profile depth PT. Typically, the height $H1_V$ of the first groove portion 3 is 1.2 mm to 10.8 mm, preferably 2 mm to 8.8 mm and particularly preferably 3.5 mm to 7 mm.

In the exemplary embodiment shown in FIG. 1, a third groove portion 5 outwardly adjoins the first groove portion 3 of a first cross section in the radial direction $R_1$. Said groove portion 5 thus extends in the radial direction $R_1$ from the first groove portion 3 as far as the tread surface. The width of the third groove portion 5 decreases steadily at an increasing distance from the surface of the tread 2 from the width $B_{V,O}$ of the first cross section on the surface of the tread 2 to the width $B_{V,1}$ of the first groove portion 3. Correspondingly, the sides of the cross-sectional area of the third groove portion 5 form straight lines perpendicular to the circumferential direction. The width $B_{V,O}$ in the axial direction A of the first cross section of the circumferential groove on the surface of the tread 2 is 4 mm in the exemplary embodiment when the pneumatic vehicle tire is new. In other embodiments of the inventive pneumatic vehicle tires, in which the first cross section of a circumferential groove is made up of three groove portions, the width $B_{V,O}$ of the first cross section on the surface of the first tread 2 when the pneumatic vehicle tire is new is typically 1.5 mm to 7 mm, preferably 3 mm to 6 mm and particularly preferably 3.5 mm to 5 mm.

Figure 2:
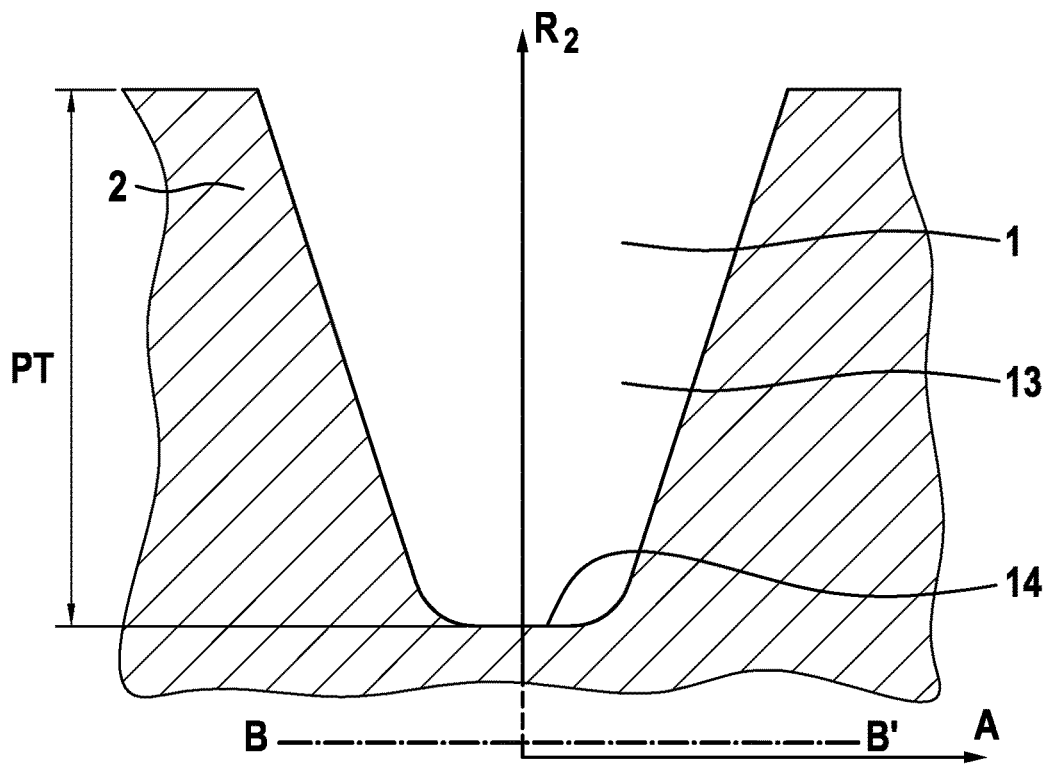
FIG. 2: shows a second V-shaped cross section of a circumferential groove according to the prior art

FIG. 2 shows a second cross section of a circumferential groove, in which partial sections, which have a first cross section, shown in FIG. 1, and a second cross section, shown in FIG. 2, are present in alternating fashion over the entire circumference of the tire.

As already mentioned above, embodiments with the cross sections of FIGS. 1 and 2 are known from the prior art. The cross section of a circumferential groove shown in FIG. 2 is symmetrical to a radial direction $R_2$ and has a V-shaped cross section 13. The two sides of the cross section perpendicular to the circumferential direction converge toward the radial direction $R_2$ as the depth increases. Furthermore, the cross section has a base region 14 which is formed by a surface along the axial direction A. As already described, such a cross section is very well suited to absorbing water from the roadway in wet conditions and to thus improving the braking behavior in the wet. However, the rigidity of the rubber material surrounding the cross section suffers as a result, and therefore, when the tire rolls on the roadway, considerable flexing work is performed in the tire material, which consumes energy. Accordingly, the rolling resistance of the tire is increased by this shape of the circumferential groove.

Figure 3:
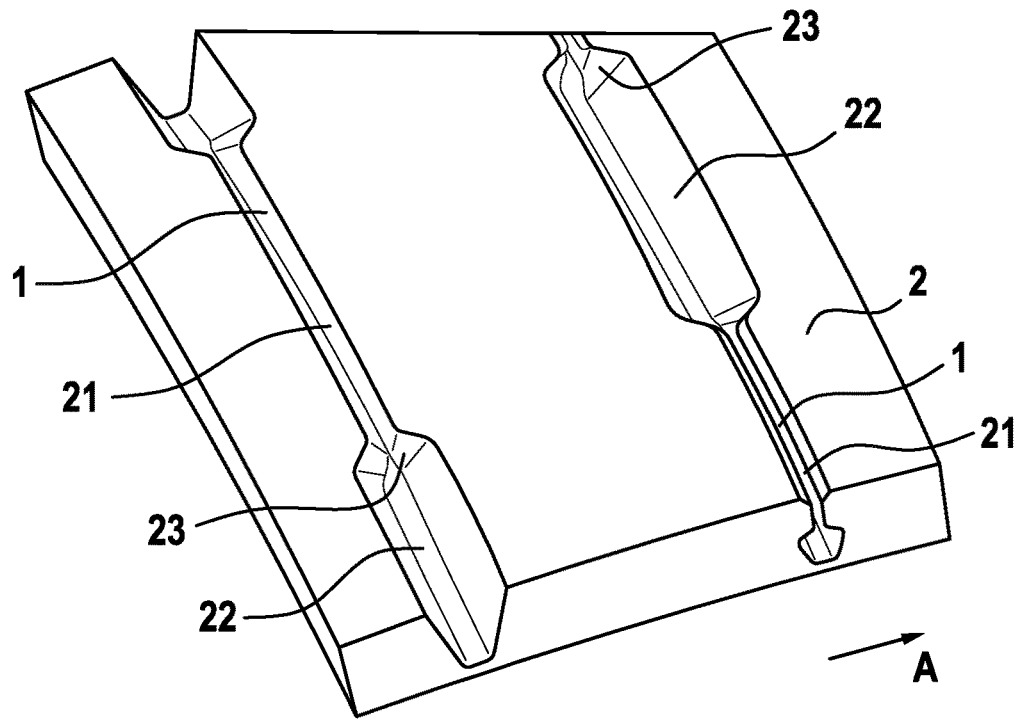
FIG. 3: shows a tread detail of a pneumatic vehicle tire according to the prior art with two circumferential grooves

FIG. 3 shows a detail of a tread 2 of a pneumatic vehicle tire that is known from the prior art. Two circumferential grooves 1 which run in encircling fashion in parallel and which have both the first cross section, shown in FIG. 1, and the second cross section, shown in FIG. 2, are shown here. The partial sections 21 of the two circumferential grooves here have the first cross section, shown in FIG. 1, while the partial sections 22 in the two circumferential grooves have the V-shaped second cross section, shown in FIG. 2.

Between the two cross sections there is in each case a transition region 23 in the circumferential direction, in which the two cross sections merge into one another. In order to optimally use both the favorable rolling resistance of the first cross section, shown in FIG. 1, and the favorable behavior of the second V-shaped cross section in the wet, the partial sections of the first cross section and of the second V-shaped cross section 21, 22 are arranged at the same location in two parallel circumferential grooves in the circumferential direction. The alternating arrangement of both cross sections both in the circumferential direction of the grooves and in the case of parallel grooves in the axial direction A means that both a favorable rolling resistance and a favorable behavior in the wet are used uniformly over the tread surface. Despite everything, there is a further need for improvement in this prior art with regard to the rolling resistance in order to further reduce the fuel consumption and thus according to the $CO_2$ emissions from the vehicle on which the pneumatic vehicle tire is mounted.

Figure 4:
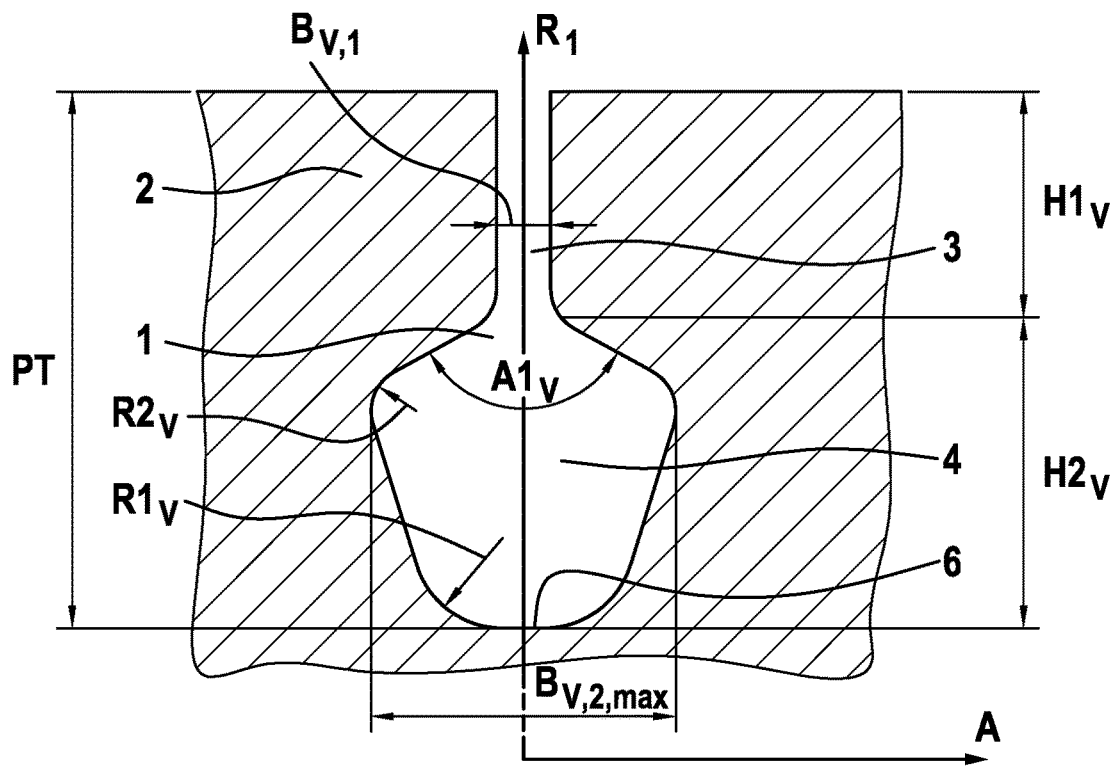
FIG. 4: shows a first cross section of a circumferential groove with two groove portions

FIG. 4 shows another embodiment of how a first cross section of a circumferential groove 1 can be designed. In this case, the cross section has only two groove portions. Compared to the cross section shown in FIG. 1, the third groove portion 5 has been omitted and the height of the first groove portion 3 has thus been enlarged in the radial direction $R_1$. While all the other proportions of the cross section shown in FIG. 1 are also present in a cross section of FIG. 4, this cross section now has a significantly reduced width $B_{V,O}$ of the circumferential groove on the surface of the tread 2. This is now the width of the first groove portion. Accordingly, the width $B_{V,O}$ at the surface of the tread 2 in the cross section which is shown in FIG. 4 is now 1.2 mm. In general, in an embodiment that has only the first and second groove portions in the first cross section, the width $B_{V,1}$ of the first groove portion 3 is also the width $B_{V,O}$ of the cross section at the surface of the tread 2. FIGS. 1 and 4 have now shown, by way of example, embodiments of a first cross section, which can also be present in the circumferential grooves 1 of a pneumatic vehicle tire according to the invention. In contrast, an improved geometry of the cross section is used for the second cross section of the circumferential grooves 1 of a pneumatic vehicle tire according to the invention.

Figure 5:
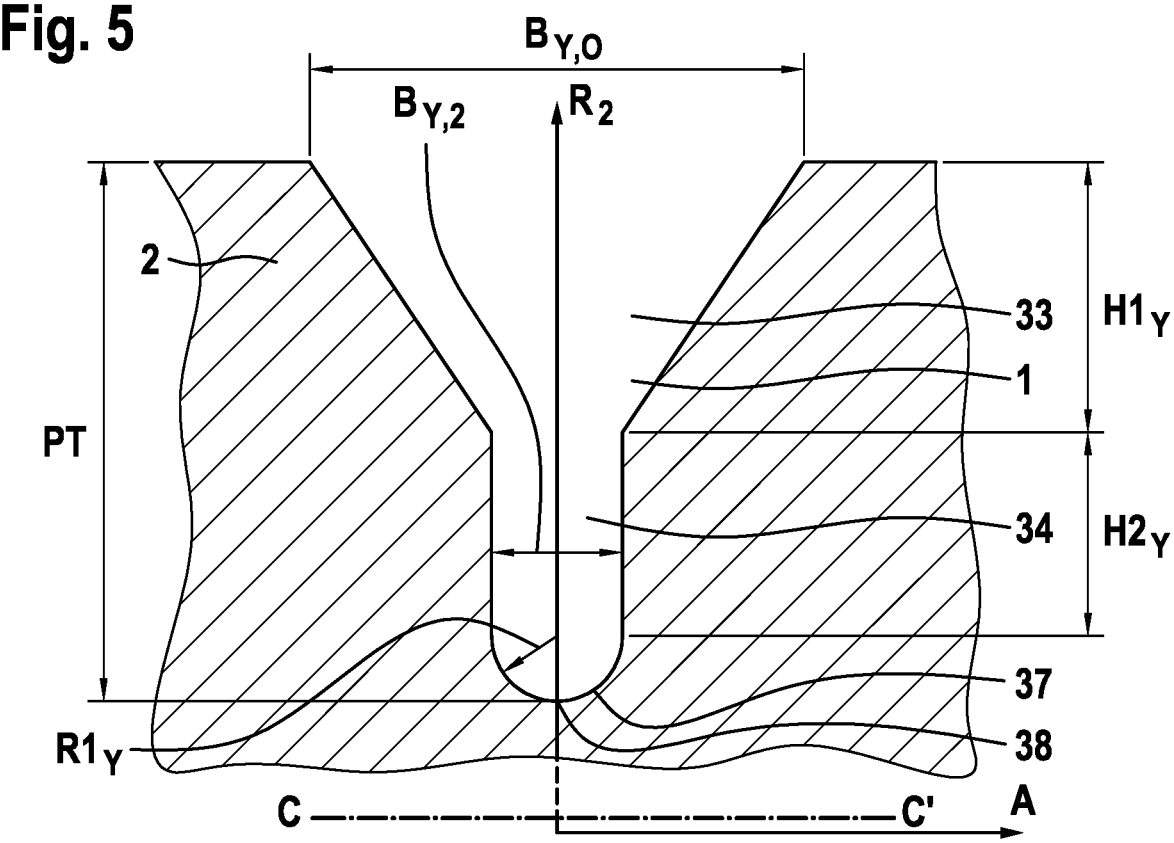
FIG. 5: shows a second cross section of a circumferential groove of a first embodiment of a pneumatic vehicle tire according to the invention

FIG. 5 shows the second cross section of a circumferential groove 1 belonging to a first embodiment of a pneumatic vehicle tire according to the invention. The cross section shown has a first groove portion 33 which widens steadily outward. A second groove portion 34 adjoins inward in the radial direction $R_2$.

Said groove portion has a constant width $B_{Y,2}$ in the axial direction A. The constant width $B_{Y,2}$ of the second groove portion 34 is 3 mm. The height of the second groove portion in the radial direction $R_2$ is 4.55 mm. Owing to the fact that the width of the second groove portion 33 widens continuously, starting from the second groove portion, toward the surface of the tread 2, the cross section of the first groove portion has sides which are given by straight lines. The width in the axial direction A of the first groove portion 33 widens from the width $B_{Y,2}$ of the second groove portion 34 up to the width $B_{Y,O}$ of the transverse groove on the surface of the tread 2. In the new condition shown of the pneumatic vehicle tire, said width is 11 mm. The height $H_{1,Y}$ of the first groove portion 33 in the radial direction $R_2$ is 5.95 mm. The second cross section shown in FIG. 5 is designed symmetrically to the radial direction $R_2$. Correspondingly, both groove portions 33 and 34 are also symmetrical to the radial direction $R_2$. The base region of the circumferential groove 37 inwardly adjoins a second groove portion 34 of the cross section shown in the radial direction $R_2$. The base region 37 has the lowest point 38 of the cross section of the circumferential groove. The base region 37 also has a constant radius of curvature $R1_Y$. Accordingly, the base region 37 is formed by a semicircle, the diameter of which corresponds to the width $B_{Y,2}$ of the second groove portion. Accordingly, the radius of curvature $R1_Y$ of the base region is 1.5 mm.

Figure 6:
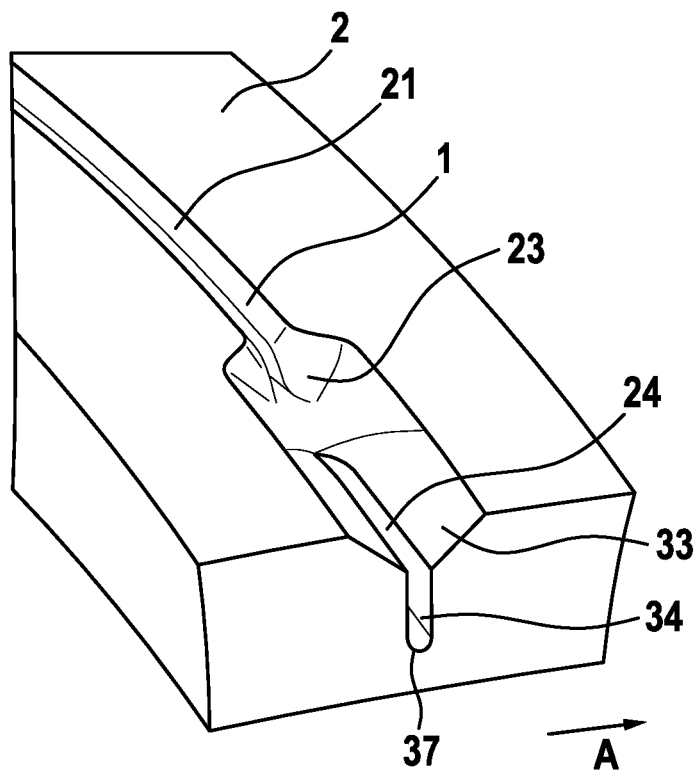
FIG. 6: shows a tread detail of the first embodiment of a pneumatic vehicle tire according to the invention with a circumferential groove

FIG. 6 shows a tread detail of the first embodiment of a pneumatic vehicle tire according to the invention. The detail of the tread 2 shows a circumferential groove 1 which, in the circumferential direction, has a partial section 21 with the first cross section, shown in FIG. 1, and a partial section 24 with the second cross section, shown in FIG. 5. In addition, a transition region 23 between the partial sections 21, 24 of the two cross sections, the first and second cross section, is shown in the circumferential direction. The first groove portion 33, the second groove portion 34 and the base region 37 of the second cross section can be clearly seen on the front cross-sectional area.

Figure 7:
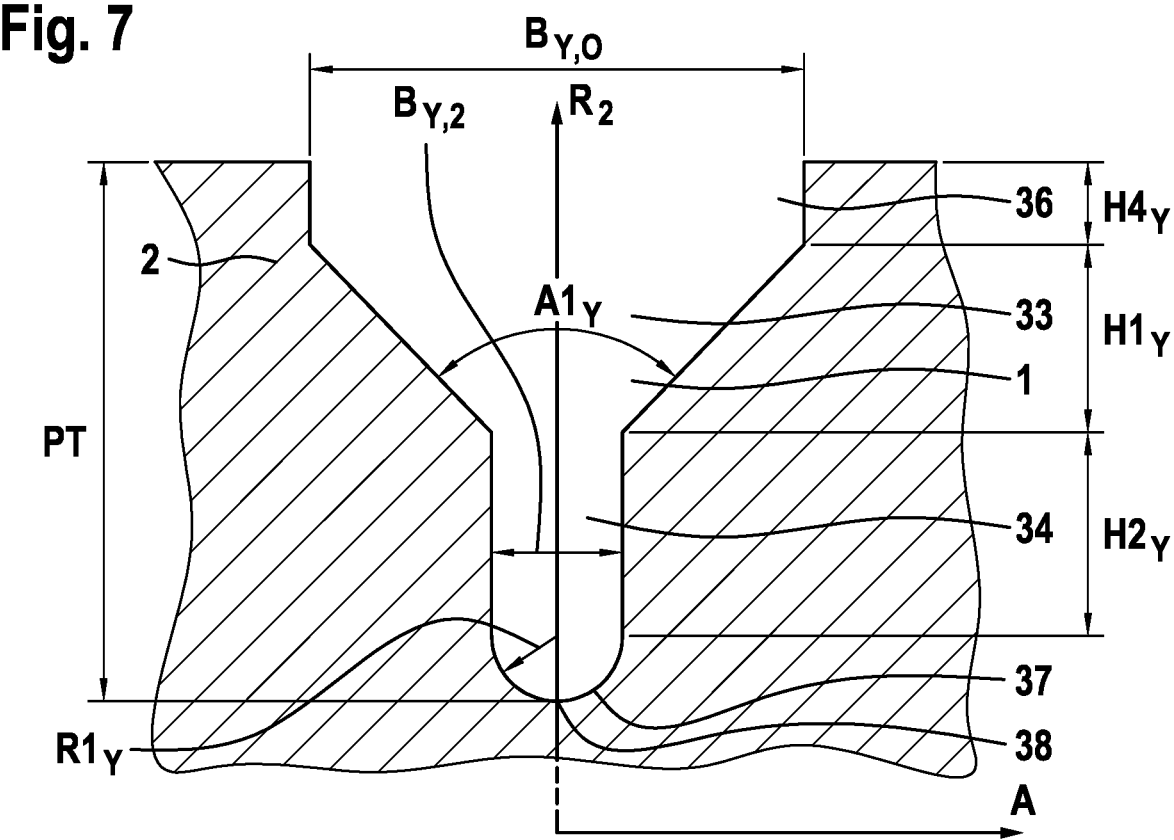
FIG. 7: shows a second cross section of a circumferential groove of a second embodiment of a pneumatic vehicle tire according to the invention

FIG. 7 shows the second cross section of a circumferential groove of a second embodiment of the pneumatic vehicle tire according to the invention. It is repeated once again that the first cross section of the circumferential groove has a cross section shown in FIGS. 1 and 4, for example. In this embodiment as well, the second cross section has a first groove portion 33, a second groove portion 34 and a base region 37. The geometry and the dimension of the second groove region 34 and the base region 37 are unchanged compared to the cross section of the first embodiment shown in FIG. 5. A fourth groove portion 36 adjoins the first groove portion 33 on the outside toward the surface of the tread 2. While the width of the first groove portion 33 increases steadily as the distance from the surface of the tread 2 decreases, until it reaches the width $B_{Y,O}$, the fourth groove portion 36 has a constant width $B_{Y,O}$ in the axial direction A. The height $H_{1,Y}$ of the first groove portion 33 in the radial direction $R_2$ is 3.9 cm and the height $H_{4Y}$ of the fourth groove portion 33 is 2.05 cm. The two straight lines of the sides of the cross-sectional area of the first groove portion 33 are inclined with respect to each other in such a manner that they enclose an angle $A1_Y$ of 80°. In other embodiments, the angle of inclination of the two sides with respect to each another can typically be 30° to 180°, preferably 50° to 150° and particularly preferably 75° to 120°.

Figure 8:
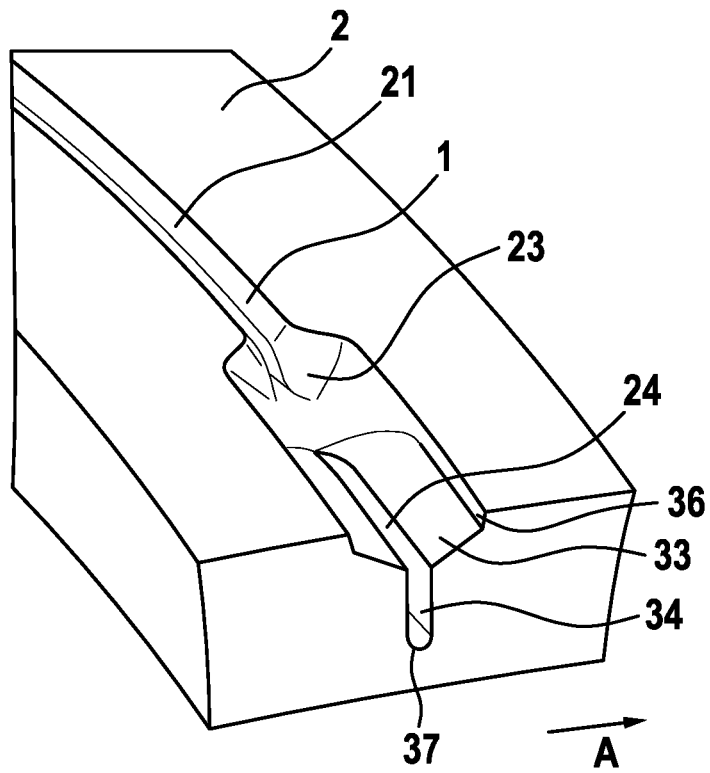
FIG. 8: shows a tread detail of the second embodiment of a pneumatic vehicle tire according to the invention with a circumferential groove

FIG. 8 shows the detail of a tread 2 of the second embodiment of one of the pneumatic vehicle tires according to the invention. There is a circumferential groove 1 in this detail of the tread 2. A partial section 21 of the circumferential groove 1 is shown with the first cross section, which is shown in FIG. 1. A partial section 24 of the circumferential groove 1 is also shown, which has the second cross section, shown in FIG. 7. The constituent parts of the second cross section of the circumferential groove 1 are visible in particular at the front end of the tread detail. The first groove portion 33 which widens toward the surface of the tread, the second groove portion 34 of constant width that adjoins the inside of the tire, and adjoining thereon the region 37 of the second cross section are seen. Furthermore, starting directly on the surface of the tread 2, the fourth groove portion 36 has a constant width in the axial direction A. In the circumferential direction, between the first cross section and the second cross section of the circumferential groove 1, there is again a transition region 23 between the two cross sections.

Figure 9:
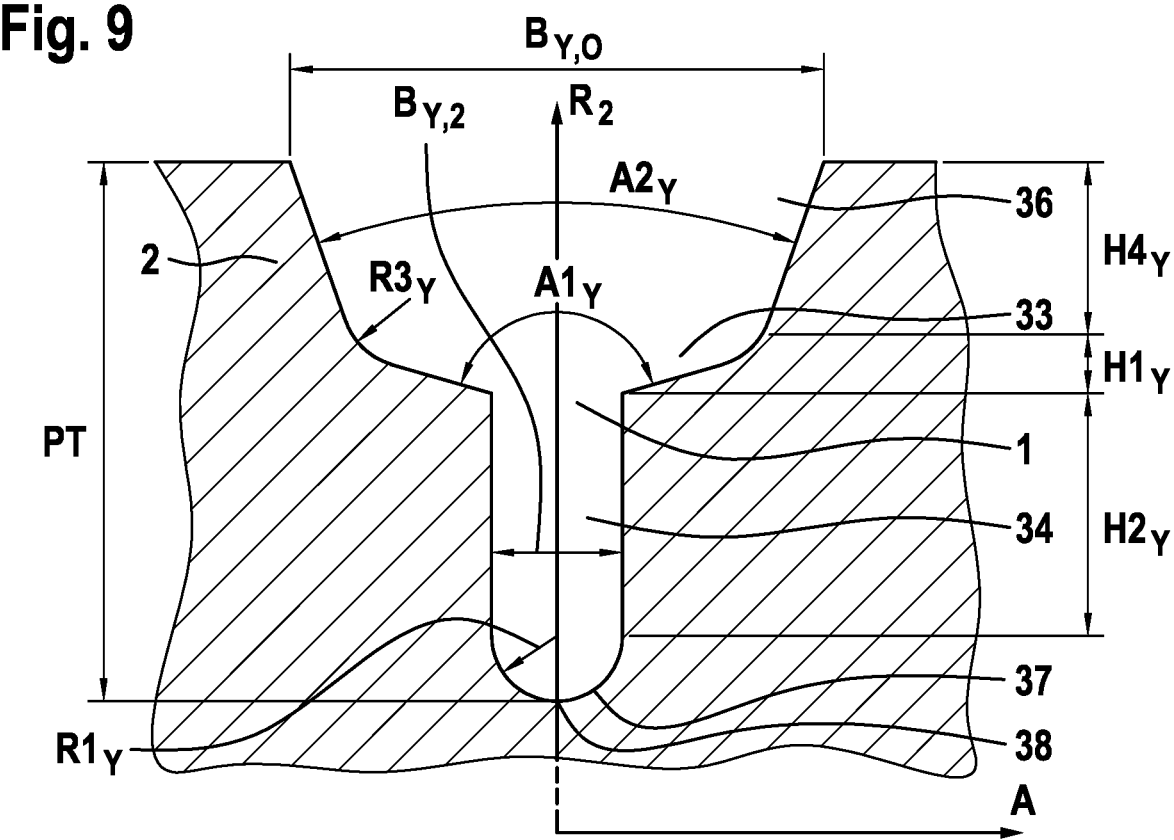
FIG. 9: shows a second cross section of a circumferential groove of a third embodiment of a pneumatic vehicle tire according to the invention

FIG. 9 shows the second cross section of a circumferential groove 1 belonging to a third embodiment of a pneumatic vehicle tire according to the invention. Here too, the circumferential groove 1 has a further first cross section, which can be, for example, a cross section which is shown in FIG. 1 or 4. The second cross section in FIG. 9 perpendicular to the circumferential direction is made up of a first groove portion 33, an inwardly adjoining second groove portion 34, a base region 37 of the second cross section inwardly adjoining the second groove portion 34, and a fourth groove portion 36 which outwardly adjoins the first groove portion 33 toward the tread surface in the radial direction $R_2$. The geometry and dimension of the second groove portion 34 and of the base region 37 correspond to those of the first embodiment shown in FIG. 5. In the case of the first groove portion 33, the width in the axial direction A increases steadily as distance from the tread surface becomes smaller. Accordingly, the sides of this groove portion are initially formed by straight lines. The straight lines on the two sides form an angle $A1_Y$ of 145° here. In addition, the first groove portion 33 has a curvature in the region which is at the smallest distance from the tire surface. The radius of curvature $R3_Y$ of said curvature is 1.5 mm. In other embodiments with the same geometry of the second cross section, the angle $A1_Y$, which the two straight lines of the sides of the first groove portion 33 enclose, is typically between 110° and 180°, preferably between 125° and 165° and particularly preferably between 135° and 155°. The radius of curvature $R3_Y$ of the first groove portion 33 is typically between 0.8 mm and 6 mm, preferably between 1.2 mm and 4 mm and particularly preferably between 1.35 mm and 3 mm. Also in the case of the fourth groove portion 36, which outwardly adjoins the first groove portion 33 and ends at the surface of the tread 2, the width increases steadily in the axial direction A up to the width $B_{Y,O}$ on the surface of the tread 2. Here too, the sides of the cross-sectional area of the fourth groove portion 36 perpendicular to the circumferential direction are formed by straight lines. In the exemplary embodiment shown, the angle $A2_Y$ between the straight lines of the sides is 42°. In other embodiments with the geometry of FIG. 9, the angle $A2_Y$ of the straight lines of the sides of the fourth groove portion 36 can typically be between 0° and 90°, preferably between 10° and 60° and particularly preferably between 30° and 50°. The height $H1_Y$ of the groove portion 33 is 2.25 mm. The height $H2_Y$ of the second groove portion 34 in the radial direction $R_2$ is 5.17 mm. The height $H4_Y$ of the fourth groove portion 36 is 3.08 mm. In other embodiments, the second cross section of which has the same geometry as shown in FIG. 9, the height $H1_Y$ of the first groove portion 33 and the height $H4_Y$ of the fourth groove portion 36 and the choice of the angles $A1_Y$ and $A2_Y$ between the sides of the groove portions is adapted. The overall height in the radial direction $R_2$ of the first groove portion 33 and of the fourth groove portion 36 is typically 4 mm to 6.5 mm, preferably 4.5 mm to 6 mm and particularly preferably 5 mm to 5.5 mm in other embodiments with the same geometry of the second cross section.

Figure 10:
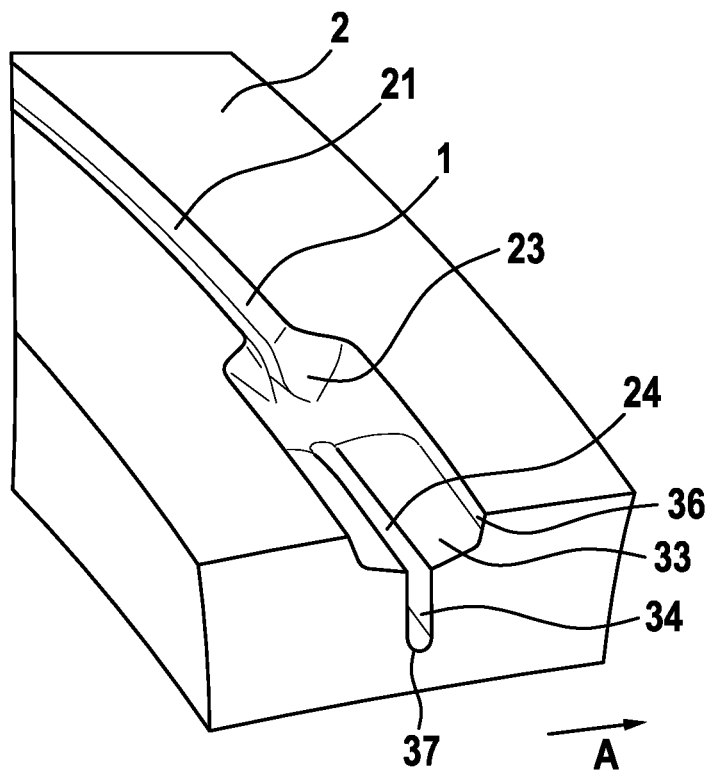
FIG. 10: shows a tread detail of the third embodiment of a pneumatic vehicle tire according to the invention with a circumferential groove

FIG. 10 shows a detail of a tread 2 of the third embodiment of a pneumatic vehicle tire according to the invention. A circumferential groove 1 is also shown again in this detail. A partial section 21 of the circumferential groove 1 can be seen here in the circumferential direction with a first cross section, as shown in FIG. 1. Also shown is a partial section 24 of the circumferential groove 1 in the circumferential direction, which has the second cross section shown in FIG. 9. The first groove portion 33, the second groove portion 34, the groove base 37, and the fourth groove portion 36 of this cross section can be seen at the lower end of the cross section. A transition region 23, in which the first cross section of the circumferential groove 1 merges into the second cross section of the circumferential groove, is also shown.

Figure 11:
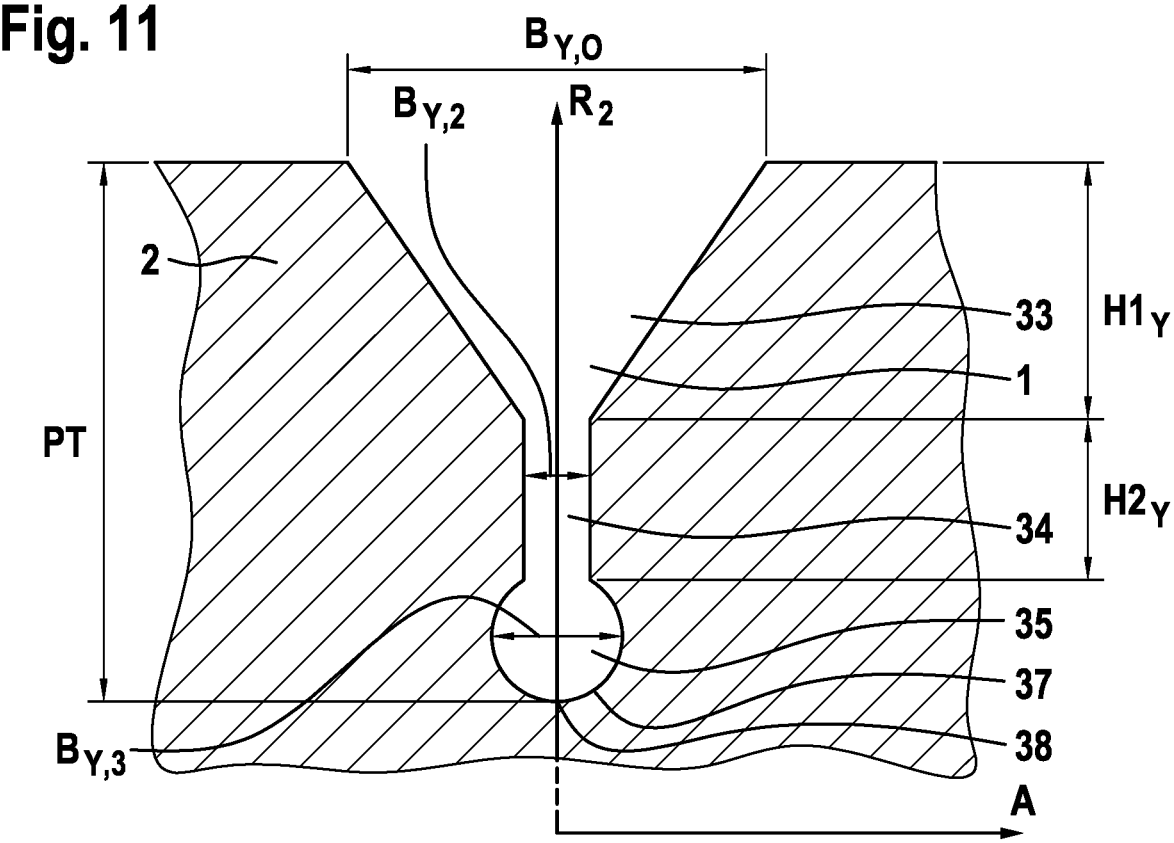
FIG. 11: shows a second cross section of a circumferential groove of a fourth embodiment of a pneumatic vehicle tire according to the invention

FIG. 11 shows a circumferential groove 1 of a fourth embodiment of a pneumatic vehicle tire according to the invention. Here, in turn, its cross section is shown perpendicular to the circumferential direction of the tire. This is the second cross section of the circumferential groove 1. In addition, the circumferential groove has a first cross section, e.g. as is shown in FIGS. 1 and 4 by way of example. The outwardly widening first groove portion 33 is shown. The second groove portion 34 then adjoins inward in the radial direction $R_2$. Said groove portion has a width $B_{Y,2}$ of 1.2 mm. In the case of the first groove portion 33, the width in the axial direction widens from the width $B_{Y,2}$ of the groove portion 34 continuously up to the width $B_{Y,O}$ on the surface of the tread 2, which is 11 mm when the pneumatic vehicle tire is new. The height $H1_Y$ of the first groove portion 33 is 5.57 mm. The height $H2_Y$ of the second groove portion 34 is 3.43 mm. The second groove portion 34 is inwardly adjoined in the radial direction $R_2$ by a third groove portion 35, which comprises the base region 37 of the second cross section and is droplet-shaped. The cross section of the third groove portion 35 perpendicular to the circumferential direction is circular and has a diameter $B_{Y,3}$ of 3 mm. The lowest point 38 of the second cross section is located in the base region 37 encompassed by the third groove portion 35.

Figure 12:
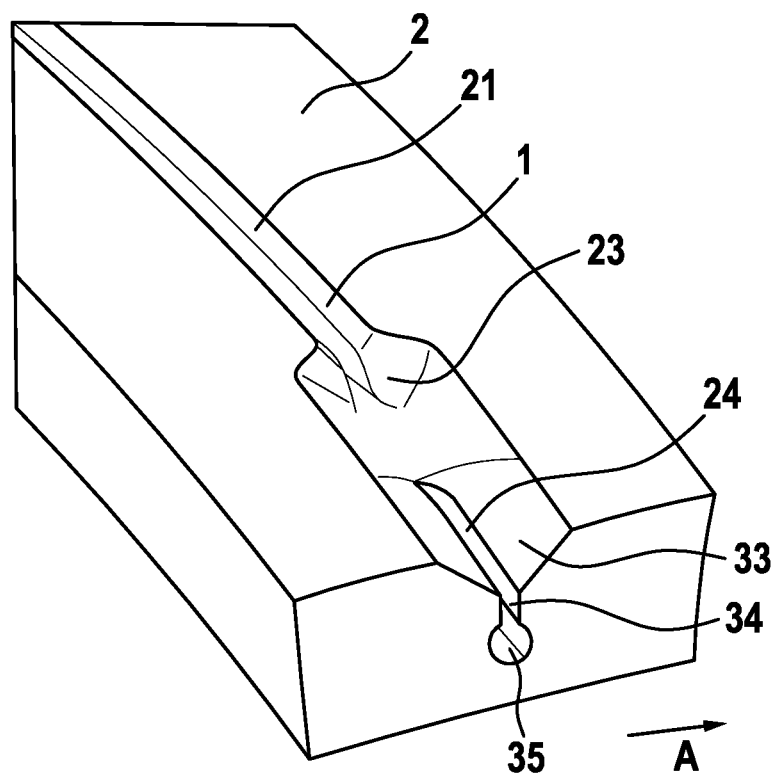
FIG. 12: shows a tread detail of the fourth embodiment of a pneumatic vehicle tire according to the invention with a circumferential groove

FIG. 12 shows a detail of a tread 2 of the fourth embodiment of the pneumatic vehicle tire according to the invention. There is a circumferential groove 1 in the detail. A partial section 21 of the circumferential groove 1 is shown, which has the first cross section, which is shown in FIG. 1. Also shown is a partial section 24 of the circumferential groove, which has the second cross section, which is shown in FIG. 11. In the lower section of the detail of the tread, the first groove portion of the second cross section 33, the second groove portion 34 of the second cross section and the third groove portion 35 of the second cross section can be seen again. The transition region 23 between the two partial sections 21 and 24, in which the first cross section of the circumferential groove 1 merges into the second cross section of the circumferential groove 1, is also shown.

Figure 13:
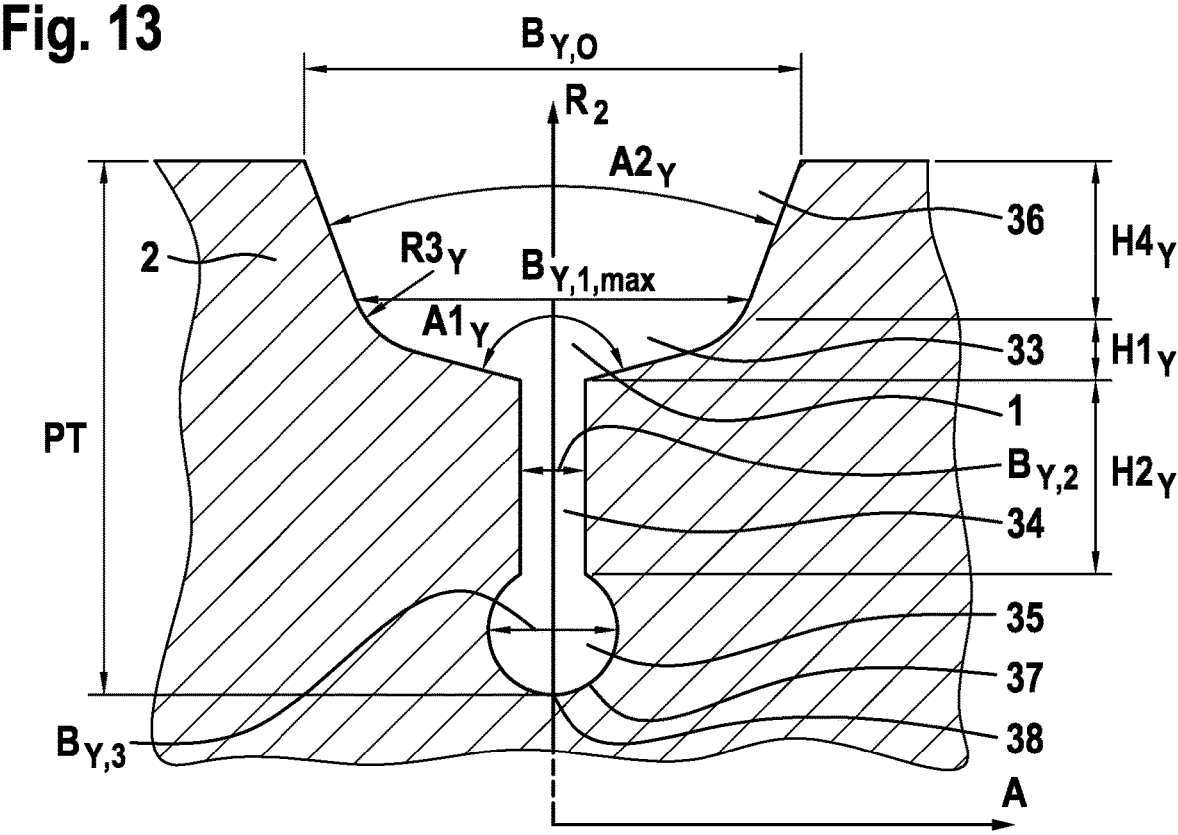
FIG. 13: shows a second cross section of a circumferential groove of a fifth embodiment of a pneumatic vehicle tire according to the invention

FIG. 13 shows the second cross section of a circumferential groove 1 belonging to a fifth embodiment of a pneumatic vehicle tire according to the invention. The first cross section of this circumferential groove 1 can in turn be the cross section shown in FIG. 1 or the cross section shown in FIG. 4. Here, too, the second cross section has four groove portions. The first groove portion 33 and the fourth groove portion 36 correspond to the first groove portion 33 and to the fourth groove portion 36 of the third embodiment shown in FIG. 9. This relates to the geometry, the dimensions and angles. The second groove portion 34 and the third groove portion 35 of the fifth embodiment correspond to the second groove portion 34 and the third groove portion 35 of the fourth embodiment shown in FIG. 11. Accordingly, geometry and dimension are the same for both embodiments.

Figure 14:
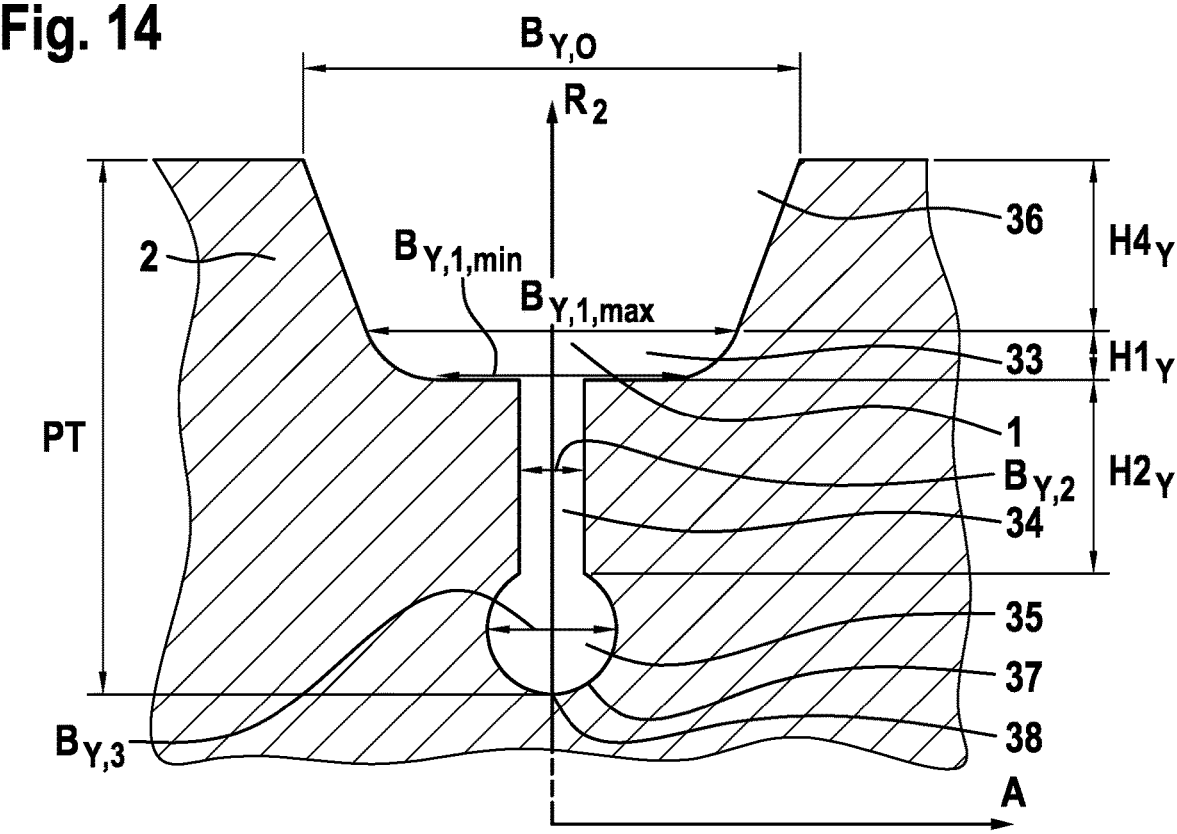
FIG. 14: shows a second cross section of a circumferential groove of a sixth embodiment of a pneumatic vehicle tire according to the invention

FIG. 14 shows the second cross section of a circumferential groove 1 of a sixth embodiment of a pneumatic vehicle tire according to the invention. In this sixth embodiment, too, the cross section has a first groove portion 33, a second groove portion 34 inwardly adjoining in the radial direction $R_2$, a third groove portion 35 inwardly adjoining the latter in the radial direction $R_2$ and a fourth groove portion 36 outwardly adjoining the first groove portion 33 in the radial direction. The geometry and the widths of the second groove portion 34 and the third groove portion 35 of the sixth embodiment correspond to those of the fourth embodiment shown in FIG. 11. The height $H2_Y$ of the second groove portion 34 is 4.1 mm. The width of the first groove portion 33 widens in the axial direction A from the width $B_{Y,1\ min}$, which is 5.4 mm, to a width $B_{Y,1\ max}$, which is 8 mm, as the distance from the surface of the tread 2 decreases. Since the minimum width $B_{Y,1min}$ of this groove portion is larger than the width of the second groove portion $B_{Y,2}$, the first groove portion 33 has an area in the axial direction A that has the width $B_{Y,1min}$. From this area, the first groove portion 33 widens by means of a curvature of the sides. The fourth groove portion 36 outwardly adjoins in the radial direction $R_2$. In this groove portion, the width in the axial direction A widens steadily from the width $B_{Y,1max}$ to the width $B_{Y,0}$ at the surface of the tread 2, which is 11 mm.

Figure 15:
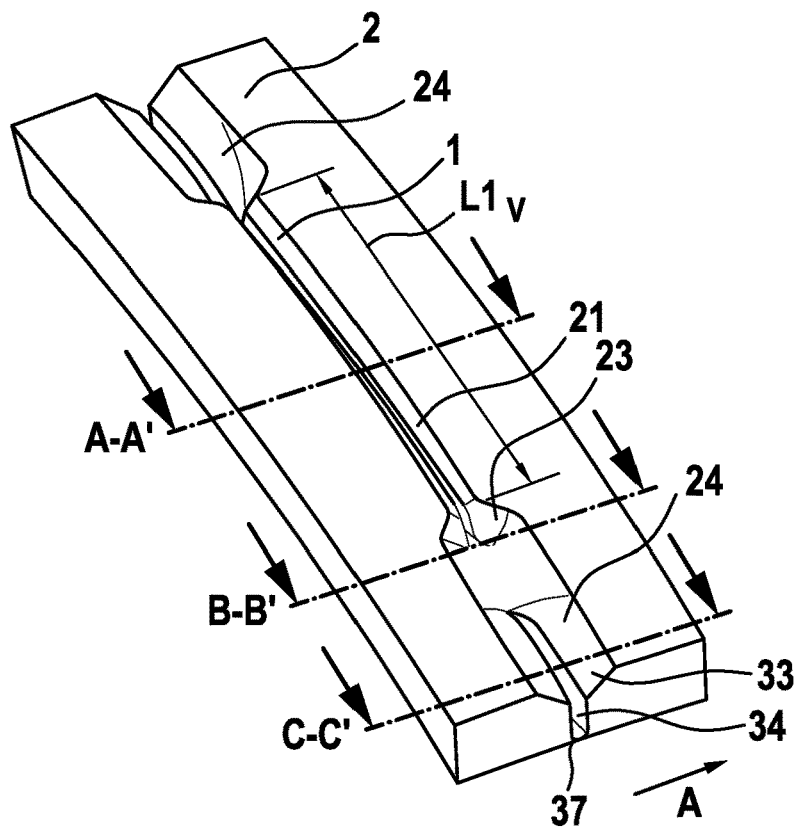
FIG. 15: shows a tread detail of the first embodiment of a pneumatic vehicle tire according to the invention with a circumferential groove, which shows the entire partial section of the first cross section of the circumferential groove

FIG. 15 shows a detail of the tread 2 of the first embodiment of a pneumatic vehicle tire according to the invention. A circumferential groove 1 is shown, with an entire partial section 21 of the circumferential groove 1 being shown in the circumferential direction, which has the first cross section as shown in FIG. 1. This partial section 21 has a length $L1_Y$ in the circumferential direction of 80 mm. The length of a partial section 21 of a circumferential groove in a pneumatic vehicle tire according to the invention with a first cross section is usually 25 mm to 120 mm, preferably 40 mm to 100 mm and particularly preferably 60 mm to 90 mm.

Figure 16:
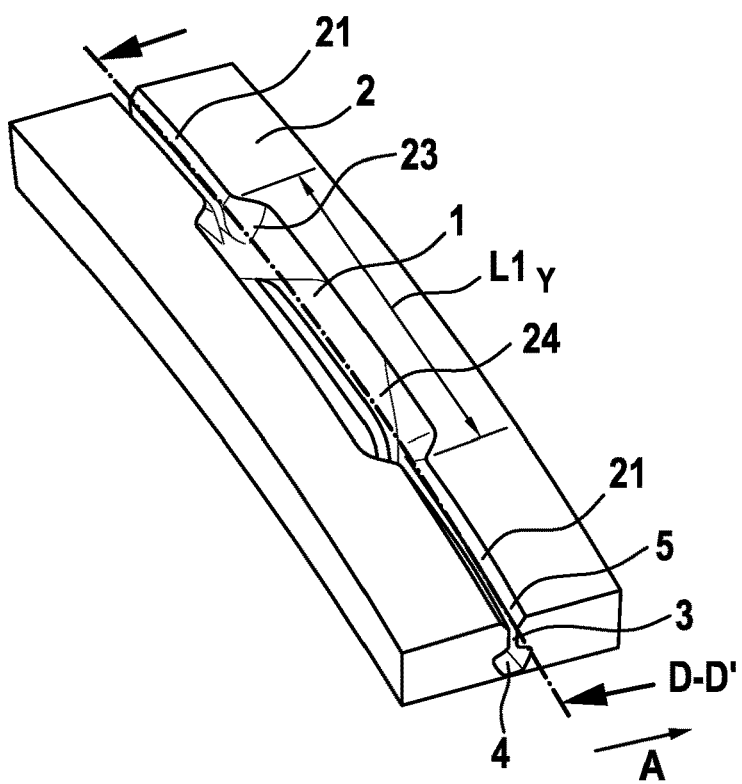
FIG. 16: shows a tread detail of the first embodiment of a pneumatic vehicle tire according to the invention with a circumferential groove, which shows the entire partial section of the second cross section of the circumferential groove

FIG. 16 shows a further detail of the tread 2 of the first embodiment of a pneumatic vehicle tire according to the invention, in which a circumferential groove 1 is located. This detail shows an entire partial section 24 of the circumferential groove 1, in which the latter has the second cross section shown in FIG. 5.

Figure 17:
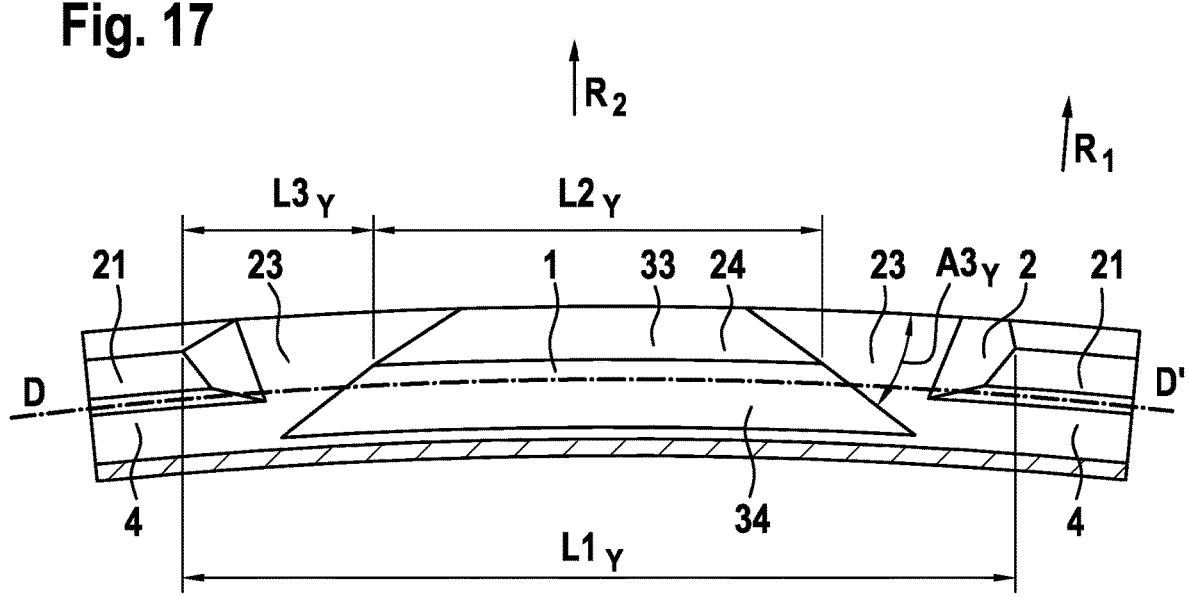
FIG. 17: shows a cross section through a circumferential groove of the first embodiment of a pneumatic vehicle tire according to the invention perpendicular to the axial direction A
Figure 18:
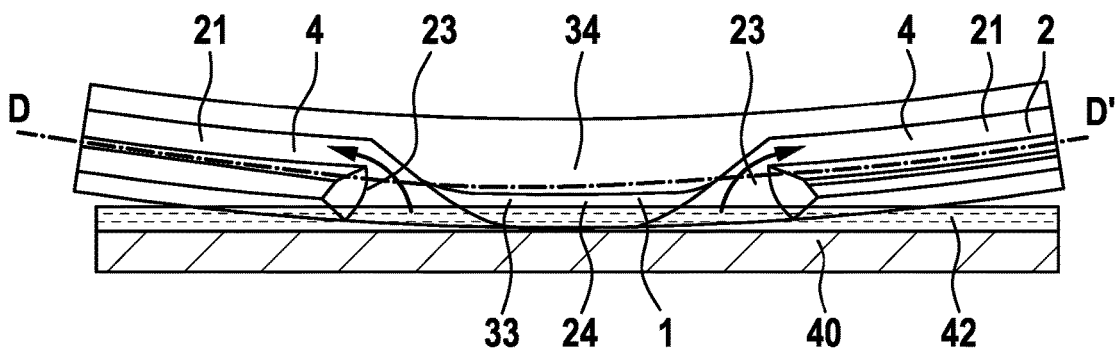
FIG. 18: shows a cross section through a circumferential groove of the first embodiment of a pneumatic vehicle tire according to the invention perpendicular to the axial direction A when in contact with a wet roadway

Furthermore, parts of partial sections 21 of the circumferential groove 1, in which they have the first cross section shown in FIG. 1, can also be seen. In addition, the transition region 23 between the first and second cross section of the circumferential groove 1 is shown. At the lower end of the detail, the first cross section of the circumferential groove shown in FIG. 1 is shown once again, with the first groove portion 3, the second groove portion 4 and the third groove portion 5 being visible in particular. Furthermore, the distance $L_{1Y}$ is shown, which shows the distance between two partial sections 21 with the first cross section in the circumferential direction. Going back now to FIG. 15, the complete partial section 21 of the first cross section of the circumferential groove 1 is shown there. In addition, parts of the partial sections 24 of the circumferential groove, which have the second cross section shown in FIG. 5, are shown. At the lower end of the detail, the second cross section can be clearly seen once again, in particular the first groove portion 33, the second groove portion 34 and the base region 37 of the second cross section of the circumferential groove 1. Furthermore, the intersecting lines A, A', B, B', and C, C' in the axial direction A are shown in FIG. 15. FIG. 1 shows the cross section through the circumferential groove 1 along the line A, A', the cross section through the first cross section of the circumferential groove 1. The cross section along the line B, B' is shown in FIG. 2. This cross section lies in the transition region between the two cross sections of the circumferential groove 23. It can be gathered from FIG. 2 that the cross section in the transition region is V-shaped. FIG. 5 then shows the cross section along the line C, C', which is a cross section through the second cross section of the circumferential groove 1. Also shown in FIG. 16 is the cross-sectional line D, D'. This cross-sectional line runs along the circumferential groove and the cross-sectional area thereof is perpendicular to the axial direction A. The cross section along the line D, D' along the circumferential groove is shown in FIG. 17. The tread 2 of the pneumatic vehicle tire is shown, with the surface of the tread being at the top. The distance $L1_Y$, which describes the distance between two partial sections with the first cross section, which in the exemplary embodiment shown corresponds to the length $L1_Y$ of the partial section 21 in the circumferential direction, is shown here. Furthermore, the length $L2_Y$, which corresponds to the length of the partial section 24 with the second cross section in the circumferential direction including the length of the two adjacent transition regions 23 in the circumferential direction, in which the narrowed second groove portion of the second cross section is still completely present, is shown. This length is 42 mm. The length $L2_Y$ is typically 8 mm to 110 mm, preferably 25 mm to 80 mm and particularly preferably 35 mm to 50 mm in a cross-sectional groove of a pneumatic vehicle tire according to the invention. Furthermore, the length $L3_Y$, which describes the length in the circumferential direction of a transition region 23 between the first and second cross sections over which the narrowed second groove portion of the second cross section is absent or not entirely present, is also shown. In the exemplary embodiment shown, it is 19 mm. The length $L3_Y$ of the transition region 23 is typically 5 mm to 35 mm, preferably 10 mm to 30 mm and particularly preferably 15 mm to 25 mm. FIG. 17 shows the partial section 24 of the circumferential groove 1 that has the second cross section. Also shown are parts of two partial sections 21 which have the first cross section of the circumferential groove 1. One side of the first groove portion 33 of the second cross section of the circumferential groove 1 can also be seen. Also shown is one side of the second groove portion 34 of the second cross section. One side of the second groove portion 4 of the first cross section is also seen. It is seen from this illustration that the second groove portion 4 of the first cross section and the second groove portion 34 of the second cross section are at the same depth of the tread 2. FIG. 18 now shows the same detail of the pneumatic vehicle tire according to the invention when the pneumatic vehicle tire makes contact with a roadway 40 in wet conditions. It should be noted that in FIGS. 17 and 18 the top and bottom have been reversed. How the water from the roadway 42 is absorbed by the circumferential groove 1 is shown. This is illustrated in particular by the indicated arrows. It is seen that the water from the roadway penetrates into the partial section 24 of the second cross section of the circumferential groove 1. The water from the roadway can then penetrate via the two transition regions 23 into the second groove portions 4 of the first cross section in the partial sections 21 of the circumferential groove. As indicated in particular by the arrows, a drainage effect takes place here, as a result of which water from the roadway is initially absorbed in the second cross section in the partial section 24 and passes into the first cross section via the transition regions 23. As a result, the pneumatic vehicle tire according to the invention has a large absorption capacity for water from the roadway. Nevertheless, owing to the improved structure of the second cross section in the partial sections 24, the rolling resistance is significantly reduced in these partial sections compared to the prior art. The pneumatic vehicle tire according to the invention therefore has both very good behavior in the wet and a low rolling resistance. In the case of the pneumatic vehicle tire according to the invention, the rolling resistance is therefore optimized without any significant loss of safety. This optimization of the rolling resistance, i.e. minimization of the rolling resistance, can reduce the fuel consumption of the vehicle that is fitted with the pneumatic vehicle tires according to the invention, and accordingly also the $CO_2$ emission of this vehicle.

Figure 19:
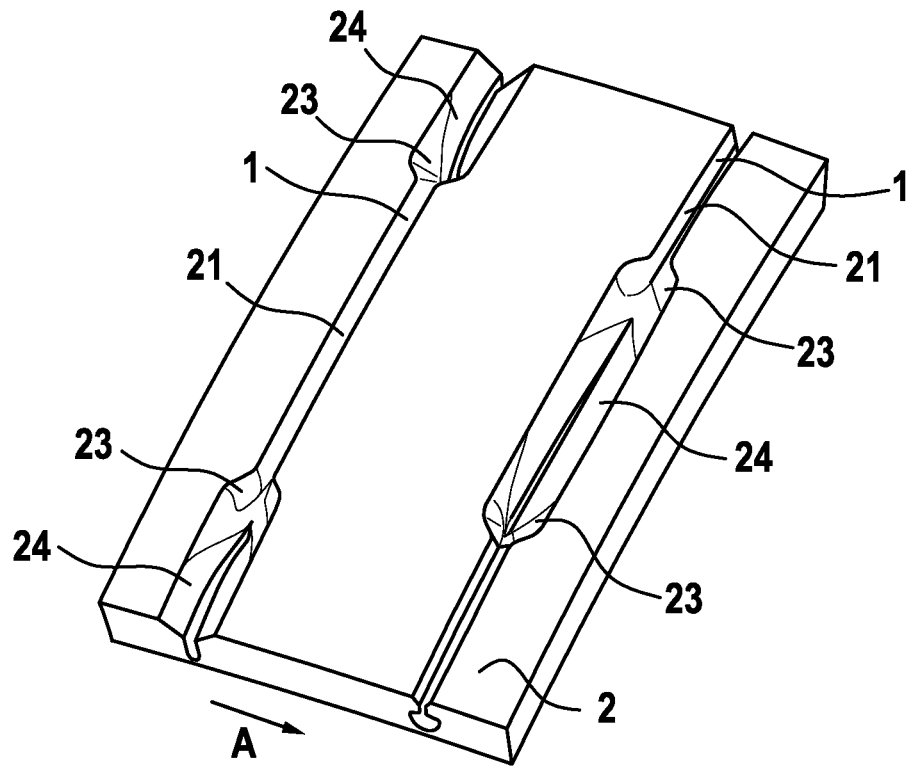
FIG. 19: shows a tread detail of the first embodiment of a pneumatic vehicle tire according to the invention with two circumferential grooves
Figure 20:
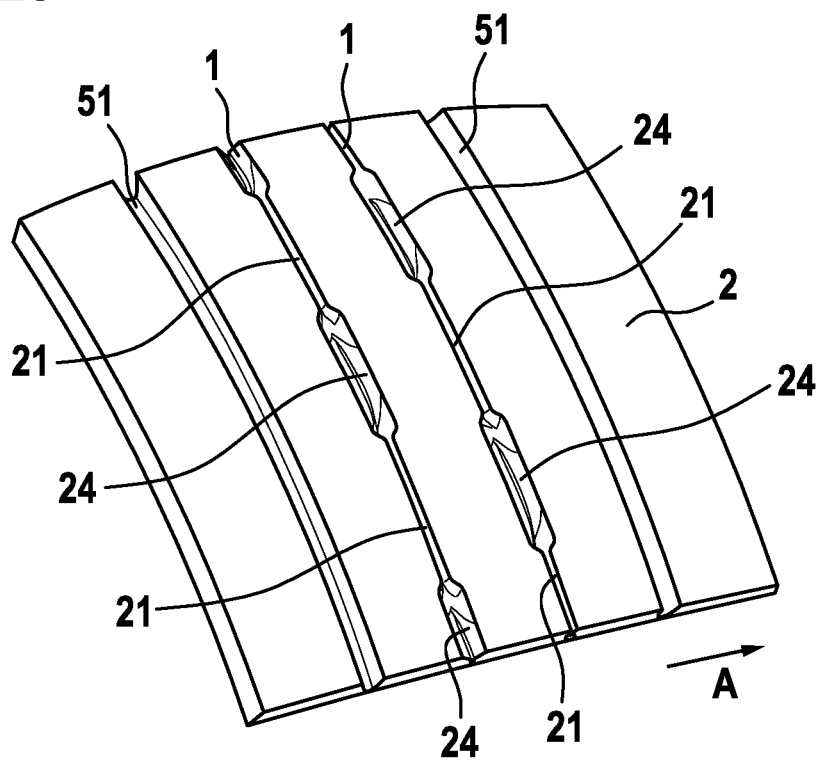
FIG. 20: shows a tread detail of the first embodiment of a pneumatic vehicle tire according to the invention in a new condition over the entire tread width
Figure 21:
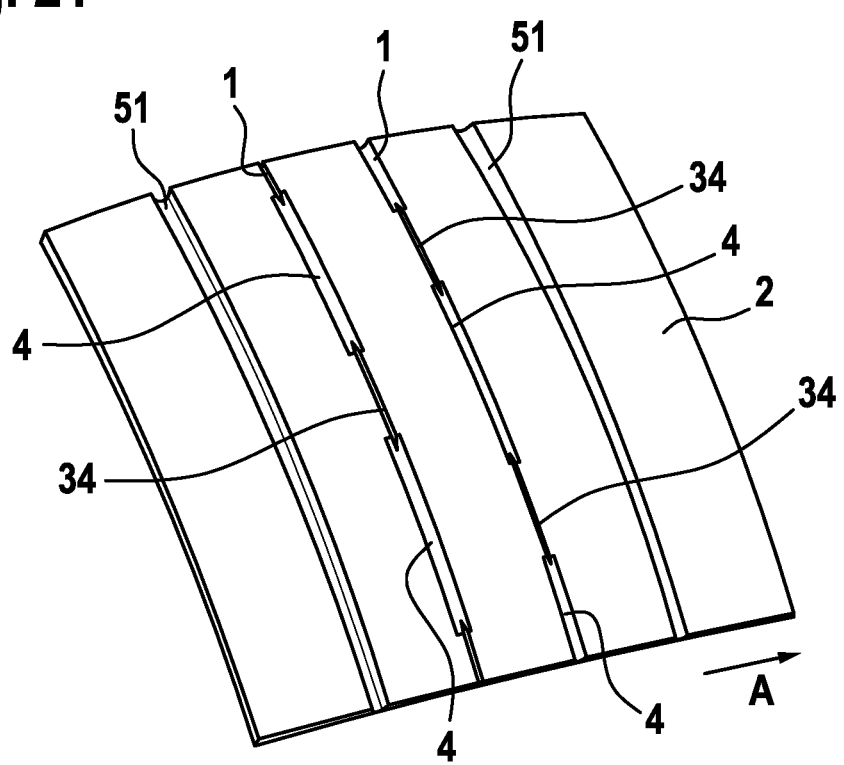
FIG. 21: shows a tread detail of the first embodiment of a pneumatic vehicle tire according to the invention over the entire tread width with a remaining profile depth of 4 mm

FIGS. 19, 20 and 21 show further details of the tread 2 of the first embodiment of the pneumatic vehicle tire according to the invention. Two circumferential grooves 1, which run parallel and have the first cross section, shown in FIG. 1, in the partial sections 21 in the circumferential direction and the second cross section, shown in FIG. 5, in the partial sections 24 in the circumferential direction, are shown here. Also shown in FIG. 19 are additionally the transition regions 23 between the partial sections 21 and 24 of the two circumferential grooves. It is shown that, in the case of the two circumferential grooves 1, the partial sections 21, 24 of the two cross sections are each arranged at the same circumferential positions. While the partial section 21 of the first cross section is located in a circumferential groove, the partial section 24 of the second cross section is located in the second circumferential groove, and vice versa. This is also shown in FIGS. 20 and 21, which show an even larger detail of the tread 2 both in the circumferential direction and over the width of the complete tread 2. This distribution of the partial sections 21 and 24 on the parallel circumferential grooves 1 distributes the properties of the tread 2 of the pneumatic vehicle tire according to the invention uniformly over the circumference and the width of the pneumatic vehicle tire. In all the positions of the tread 2 there is good behavior in the wet and a low rolling resistance.

The tread 2 of the pneumatic vehicle tire is shown over the entire width of the tread 2 in FIGS. 20 and 21. The tread 2 has a total of four circumferential grooves. In addition to the two circumferential grooves 1 which have the first and the second cross section, there are also two outer grooves 51 in the profile of the pneumatic vehicle tire. These two outer grooves 51 have a V-shaped cross section. While FIG. 20 shows the new condition of the profile of the tread 2, FIG. 21 shows the condition of the tread when the profile depth of the circumferential grooves is reduced to a depth of 4 mm. When comparing the two figures, it can clearly be seen that, in the case of the two circumferential grooves 1, the partial sections have changed in which the circumferential grooves 1 have a cross section that is open on the tread surface, or a cross section in which the width of the circumferential groove in the axial direction A is very narrow. It can be seen that owing to the structure of the first cross section, as in various groove portions, even with advanced wear, as in FIG. 21, there are still partial sections of the circumferential grooves 1 that are suitable for absorbing water from the roadway. In these partial sections, the second groove portion 4 of the first cross section is then located on the surface of the tread 2. This shows that the pneumatic vehicle tires according to the invention also have good wet behavior and a low rolling resistance over the service life of the pneumatic vehicle tire.

The nominal width of the pneumatic vehicle tires according to the invention is typically 280 mm to 460 mm, preferably 290 mm to 400 mm and particularly preferably 300 mm to 330 mm. In the embodiments shown in the figures, the nominal width of the pneumatic vehicle tire shown is 315 mm. The nominal width of the pneumatic vehicle tires is defined according to ISO standard 5775.

The nominal cross-sectional ratio, i.e. the ratio of the tire height to the nominal width in %, is typically 40% to 95% for pneumatic vehicle tires according to the invention, preferably 45% to 80% and particularly preferably 50% to 70%. In the embodiments of the figures, the ratio of the tire height to the nominal width is 70%.

The pneumatic vehicle tires according to the invention typically have 2 to 6 grooves, preferably 3 to 5 grooves and particularly preferably 4 circumferential grooves.

The pneumatic vehicle tires according to the invention are used on wheels which preferably have a rim diameter of 19.5 inches and particularly preferably a rim diameter of 22.5 inches.

The pneumatic vehicle tires according to the invention are preferably used on buses and trucks. They are used for light trucks, preferably for medium-duty trucks, in particular with an overall weight of more than 7.2 tons and very particularly preferably for heavy trucks. The pneumatic vehicle tires according to the invention are used in particular for the steering wheels and trailer wheels.

Pneumatic vehicle tires according to the invention can have the features of individual, described embodiments of a pneumatic vehicle tire according to the invention or a combination of the features of different embodiments described. This is in particular because the embodiments described only illustrate examples of the pneumatic vehicle tires according to the invention for explaining the invention.

LIST OF REFERENCE SIGNS

1 Circumferential groove
2 Tread of a pneumatic vehicle tire
3 First groove portion of a first cross section of a circumferential groove
4 Second groove portion of a first cross section of a circumferential groove
5 Third groove portion of a first cross section of a circumferential groove
6 Base region of a first cross section of a circumferential groove
13 V-shaped second cross section of a circumferential groove
14 Base region of the V-shaped second cross section of a circumferential groove
21 Partial section of a circumferential groove with a first cross section
22 Partial section of a circumferential groove with a V-shaped second cross section
23 Transition region between first and second cross section
24 Partial section of a circumferential groove with a second cross section
33 First groove portion of a second cross section of a circumferential groove
34 Second groove portion of a second cross section of a circumferential groove
35 Third groove portion of a second cross section of a circumferential groove
36 Fourth groove portion of a second cross section of a circumferential groove
37 Base region of a second cross section of a circumferential groove
38 Lowest point of a second cross section of a circumferential groove
40 Roadway
42 Water from the roadway
51 Outer circumferential groove of a pneumatic vehicle tire
A Axial direction of a pneumatic vehicle tire
$A1_V$ Opening angle of the second groove portion of the first cross section of a circumferential groove
$A1_Y$ Angle between the straight lines of the sides of the first groove portion $A2_Y$ Angle between the straight lines of the sides of the fourth groove portion
$B_{V,1}$ Width of the first groove portion of the first cross section
$B_{V,2,max}$ Maximum width of the second groove portion of the first cross section
$B_{V,O}$ Width of the first cross section of a circumferential groove on the surface of the tread
$B_{Y,1max}$ Maximum width of the first groove portion of the second cross section
$B_{Y,1min}$ Minimum width of the first groove portion of the second cross section
$B_{Y,2}$ Width of the second groove portion of the second cross section
$B_{Y,3}$ Width of the third groove portion of the second cross section
$B_{Y,O}$ Width of the second cross section of a circumferential groove on the surface of the tread
$H1_V$ Height of the first groove portion of the first cross section in the radial direction $R_1$
$H1_Y$ Height of the first groove portion of the second cross section in the radial direction $R_2$
$H2_V$ Height of the second groove portion of the first cross section in the radial direction $R_1$
$H2_Y$ Height of the second groove portion of the second cross section in the radial direction $R_2$
$H4_Y$ Height of the fourth groove portion of the second cross section in the radial direction $R_2$
$L1_V$ Length of the partial section with the first cross section on the tread surface
$L1_Y$ Distance of the partial sections with the first cross section on the tread surface
$L2_Y$ Length of a partial section with the second cross section on the tread surface
$L3_Y$ Length of the transition between the first and second cross section on the tread surface
$R_1$ Radial direction of the first cross section of a circumferential groove
$R_2$ Radial direction of the second cross section of a circumferential groove
$R1_V$ Radius of curvature of the base region of the first cross section
$R1_Y$ Radius of curvature of the base region of the second cross section
$R3_Y$ Radius of curvature in the region of the first groove portion of the second cross section that is at the smallest distance from the tire surface

The invention claimed is:

1. A pneumatic vehicle tire comprising:
a tread having a profiling with a first circumferential groove and a second circumferential groove formed to a profile depth PT;
each of the first and second circumferential grooves includes alternating first and second groove sections over a circumference of the pneumatic vehicle tire in which the alternating first and second groove sections have different groove profiles;
the first groove section of the first circumferential groove having a first groove portion (3) and a second groove portion (4) of a first cross section of the first circumferential groove, the first cross section is perpendicular to the circumferential direction, wherein:
  the first (3) and second (4) groove portions directly adjoin one another in a first radial direction $R_1$ of the pneumatic vehicle tire, the second groove portion (4) being radially inward of the first groove portion,
  the first groove portion (3) and the second groove portion (4) are each symmetrical about a first line in the first radial direction $R_1$,
  the first groove portion (3) has a width $B_{V,1}$ in the axial direction A that is less than 3 mm and varies by no more than 10%,
  the second groove portion (4) widens in the axial direction A relative to the first groove portion to have a width $B_{V,2}$ in the axial direction A that is greater than the width $B_{V,1}$ of the first groove portion (3); and
the second groove section of the first circumferential groove having a first groove portion (33) and a second groove portion (34) of a second cross section of the first circumferential groove, the second cross section perpendicular to the circumferential direction, wherein:
  the first (33) and second (34) groove portions directly adjoin one another in a second radial direction $R_2$ of the pneumatic vehicle tire, the second groove portion (34) being radially inward of the first groove portion (33),
  the first (33) and second (34) groove portions are each symmetrical about a second line that extends in the second radial direction $R_2$,
  the first groove portion (33) widens as it extends radially outward relative to the second groove portion (34), the first groove portion (33) terminating at a road engagement surface of the tread to open radially outwardly at the tread, the first groove portion (33) having a width $B_{Y,O}$ in the axial direction A as measured at the road engagement surface of the tread when the pneumatic vehicle tire is new,
  the second groove portion (34) is narrowed relative to the first groove portion (33), the second groove portion (34) having a width $B_{Y,2}$ which varies in the axial direction A by no more than 10%, and which is less than 40% of the width $B_{Y,O}$ of the first groove portion (33) as measured in the axial direction A at the road engagement surface of the tread when the pneumatic vehicle tire is new,
wherein the second groove portion (34) of the second cross section extends in the second radial direction $R_2$ over at least 50% of the height $H2_V$ of the second groove portion (4) of the first cross section as measured in the first radial direction $R_1$,
wherein the second groove portion (34) of the second cross section has over at least 50% of its height $H2_Y$, as measured in the second radial direction $R_2$, being at a distance from the road engagement surface of the tread;
wherein the second groove portion (4) of the first cross section has the largest cross-sectional area relative to each of the first groove section (3) of the first cross section and the first (33) and second groove (34) sections of the second cross section;
  wherein the first circumferential groove includes respective transition regions (23) between the respective first and second groove sections, the respective transition regions having a tapered surface (23) that tapers radially inwardly from the first groove portion (33) of the second groove section and extends circumferentially toward the second groove portion (4) of the first groove section, such that, when in use on a wet road, liquid entering the first groove portion (33) of the second groove section flows across the tapered surface (23) of the transition region and enters into the second groove portion (4) of the first groove section.

2. The tire of claim 1, the second cross section the base region (37) has only one curvature which results from the width $B_{Y,2}$ in the axial direction A of the second groove portion of the second cross section.

3. The tire of claim 1, further comprising a third groove portion (35) inwardly directly adjoins the second groove portion (34) of the second cross section in the radial direction $R_2$, the third groove portion comprising the base region (37) of the second cross section and being droplet-shaped, with its maximum width $B_{Y,3}$ in the axial direction A being greater than the mean width $B_{Y,2}$ in the axial direction A of the second groove portion (34) of the second cross section.

4. The tire of claim 1, the mean width $B_{Y,2}$ of the second groove portion (34) in the axial direction A of the pneumatic vehicle tire of the second cross section is less than 15%, preferably less than 12% and particularly preferably less than 10% of the width $B_{Y,O}$ in the axial direction A of the second cross section on the surface of the tread (2) when the pneumatic vehicle tire is new.

5. The tire of claim 1, the first groove portion (33) of the second cross section constantly widens outward and the sides of the cross-sectional area have an inclination of 20° to 80°, preferably an inclination of 30° to 60° and particularly preferably an inclination of 40° to 50° relative to the radial direction $R_2$.

6. The tire of claim 1, the ratio of the area of the cross-sectional area perpendicular to the circumferential direction of the second groove portion (4) of the first cross section to the area of the cross-sectional area perpendicular to the circumferential direction of the second groove portion (34) of the second cross section is between 1 and 3, preferably between 1.5 and 2.5 and particularly preferably between 2 and 2.3.

7. The tire of claim 1, the respective transition regions (23) having lateral sidewalls that taper radially inwardly to form a V-shape in cross section of the circumferential groove (1).

8. The tire of claim 1, the base region (37) of the circumferential groove (1) inwardly directly adjoins the second groove portion (34) of the second cross section in the radial direction $R_2$.

9. The tire of claim 8, the ratio of the maximum width $B_{Y,2,max}$ in the axial direction A of the cross-sectional area of the second groove portion (4) of the first cross section to the mean width $B_{Y,2}$ in the axial direction A of the second groove portion (34) of the second cross section is between 1.5 and 4.5, preferably between 2.0 and 3.5 and particularly preferably between 2.3 and 2.8.

10. The tire of claim 8, the edge of the cross-sectional area of the third groove portion (35) of the second cross section perpendicular to the circumferential direction is circular with a diameter $B_{Y,3}$, which is greater than the mean width $B_{Y,2}$ in the axial direction A of the second groove portion (34) of the second cross section.

* * * * *